(12) United States Patent
Imai et al.

(10) Patent No.: US 12,339,217 B2
(45) Date of Patent: Jun. 24, 2025

(54) FLOW CYTOMETER

(71) Applicants: ThinkCyte K.K., Tokyo (JP); The University of Tokyo, Tokyo (JP)

(72) Inventors: Toru Imai, Tokyo (JP); Keisuke Toda, Tokyo (JP); Sadao Ota, Tokyo (JP)

(73) Assignees: ThinkCyte K.K., Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 17/935,696

(22) Filed: Sep. 27, 2022

(65) Prior Publication Data

US 2023/0090631 A1 Mar. 23, 2023

Related U.S. Application Data

(63) Continuation of application No. PCT/JP2021/013478, filed on Mar. 30, 2021.

(30) Foreign Application Priority Data

Apr. 1, 2020 (JP) .................................. 2020-065940

(51) Int. Cl.
*G01N 15/1434* (2024.01)
*G01N 15/01* (2024.01)
*G01N 15/10* (2024.01)

(52) U.S. Cl.
CPC ......... *G01N 15/1436* (2013.01); *G01N 15/01* (2024.01); *G01N 2015/1006* (2013.01)

(58) Field of Classification Search
CPC ............... G01N 15/1436; G01N 15/14; G01N 15/1434; G01N 15/1404; G01N 15/01;
(Continued)

(56) References Cited

U.S. PATENT DOCUMENTS 4,537,861 A     8/1985   Elings et al.
5,007,737 A *   4/1991   Hirleman, Jr. ..... G01N 15/0211
                                                                    356/336

(Continued)

FOREIGN PATENT DOCUMENTS

CN          1302229 A      7/2001
CN          1330151 A      1/2002

(Continued)

OTHER PUBLICATIONS

PCT/JP2021/013478 International Search Report dated Jun. 22, 2021.

(Continued)

*Primary Examiner* — Dominic J Bologna
*Assistant Examiner* — Jonathon Cook
(74) *Attorney, Agent, or Firm* — WILSON SONSINI GOODRICH & ROSATI

(57) ABSTRACT

This flow cytometer includes a flow path through which an observation object flows with a fluid; an optical illumination system including a spatial optical modulation device, and a first optical element; and an optical detection system including a first light detector, wherein the optical illumination system further includes a first spatial filter disposed in a first optical path between a light source and an image position of light imaged in the flow path by the first optical element and having a first region which hinders traveling of light emitted from the light source towards the observation object, the optical detection system further includes a second light detector disposed in a second optical path between the first light detector and the image position and having a second region which directs the light modulated by the observation object towards the first light detector, and the position of the first region and the position of the second region are in a substantially optically conjugate relationship.

20 Claims, 17 Drawing Sheets

(58) Field of Classification Search
CPC .......... G01N 15/0205; G01N 15/0211; G01N 2015/1006; G01N 2015/103; G01N 2015/0222; G01N 2015/0238; G01N 2015/025; G01N 2015/1447; G01N 2015/145

See application file for complete search history.

(56) References Cited

U.S. PATENT DOCUMENTS

| | | | |
|---|---|---|---|
| 5,017,497 A * | 5/1991 | Gerard de Grooth | G01N 15/1434 436/63 |
| 5,483,469 A | 1/1996 | Van den Engh et al. | |
| 6,064,473 A | 5/2000 | Hironaga et al. | |
| 6,249,341 B1 | 6/2001 | Basiji et al. | |
| 6,956,230 B1 | 10/2005 | Gharib et al. | |
| 7,012,738 B1 | 3/2006 | Schwarte | |
| 7,217,573 B1 | 5/2007 | Oshida et al. | |
| 7,812,303 B2 | 10/2010 | Meyers et al. | |
| 8,314,933 B2 | 11/2012 | Cui et al. | |
| 8,582,203 B2 | 11/2013 | Dunsby | |
| 9,069,175 B2 | 6/2015 | Koebler et al. | |
| 9,134,242 B2 | 9/2015 | Shaffer et al. | |
| 9,360,660 B2 | 6/2016 | Yi et al. | |
| 9,518,916 B1 | 12/2016 | Pandev et al. | |
| 9,645,377 B2 | 5/2017 | Bosworth et al. | |
| 9,915,598 B2 | 3/2018 | Kim et al. | |
| 10,646,160 B2 | 5/2020 | Yelin et al. | |
| 10,761,011 B2 | 9/2020 | Ota et al. | |
| 10,904,415 B2 | 1/2021 | Horisaki et al. | |
| 11,054,363 B2 | 7/2021 | Ota et al. | |
| 11,098,275 B2 | 8/2021 | Ota et al. | |
| 11,412,118 B2 | 8/2022 | Horisaki et al. | |
| 11,542,461 B2 | 1/2023 | Ota et al. | |
| 11,549,880 B2 | 1/2023 | Horisaki et al. | |
| 11,579,075 B2 | 2/2023 | Ota et al. | |
| 11,630,293 B2 | 4/2023 | Ugawa et al. | |
| 11,788,948 B2 | 10/2023 | Ota et al. | |
| 11,861,889 B2 | 1/2024 | Ota et al. | |
| 11,867,610 B2 | 1/2024 | Ota et al. | |
| 11,906,722 B2 | 2/2024 | Horisaki et al. | |
| 2002/0041376 A1 | 4/2002 | Kurozumi et al. | |
| 2003/0142289 A1 | 7/2003 | Ortyn et al. | |
| 2003/0162218 A1 | 8/2003 | Emalfarb et al. | |
| 2004/0061914 A1 | 4/2004 | Miyawaki et al. | |
| 2004/0189977 A1 * | 9/2004 | Nagai | G01N 33/56972 356/39 |
| 2005/0002030 A1 | 1/2005 | Kolp et al. | |
| 2005/0046849 A1 | 3/2005 | Cromwell et al. | |
| 2005/0051466 A1 | 3/2005 | Carter et al. | |
| 2007/0091315 A1 | 4/2007 | Brady et al. | |
| 2007/0151343 A1 | 7/2007 | Gross et al. | |
| 2008/0195020 A1 | 8/2008 | Cabuz et al. | |
| 2008/0214412 A1 | 9/2008 | Stahler et al. | |
| 2009/0071225 A1 | 3/2009 | Schilffarth | |
| 2009/0093807 A1 | 4/2009 | Hyde et al. | |
| 2009/0153883 A1 | 6/2009 | Shinoda | |
| 2009/0190121 A1 | 7/2009 | Hegyi et al. | |
| 2009/0194702 A1 | 8/2009 | Meyers et al. | |
| 2009/0248318 A1 | 10/2009 | Nagai et al. | |
| 2009/0290156 A1 * | 11/2009 | Popescu | G02B 21/008 359/279 |
| 2010/0170796 A1 | 7/2010 | Bhatia et al. | |
| 2010/0284016 A1 | 11/2010 | Teitell et al. | |
| 2010/0294916 A1 | 11/2010 | Meyers et al. | |
| 2012/0001090 A1 * | 1/2012 | Takasaki | G01N 21/53 250/200 |
| 2012/0004514 A1 | 1/2012 | Marugame | |
| 2012/0069170 A1 | 3/2012 | Gesley | |
| 2012/0122084 A1 | 5/2012 | Wagner et al. | |
| 2012/0128264 A1 | 5/2012 | Yazdanfar et al. | |
| 2012/0200857 A1 | 8/2012 | Sharpe et al. | |
| 2012/0204628 A1 | 8/2012 | Wagner et al. | |
| 2013/0016335 A1 | 1/2013 | Lo et al. | |
| 2013/0078733 A1 | 3/2013 | Holmes et al. | |
| 2013/0102865 A1 | 4/2013 | Mandelis et al. | |
| 2013/0155499 A1 | 6/2013 | Dixon | |
| 2013/0163844 A1 | 6/2013 | Ozaki et al. | |
| 2013/0176533 A1 | 7/2013 | Raffle et al. | |
| 2013/0200277 A1 | 8/2013 | Li et al. | |
| 2013/0202151 A1 | 8/2013 | Dauwels et al. | |
| 2013/0204538 A1 | 8/2013 | Rich | |
| 2013/0308122 A1 * | 11/2013 | Merchez | G01N 21/47 356/72 |
| 2013/0329226 A1 | 12/2013 | Matsubara et al. | |
| 2014/0073000 A1 | 3/2014 | Sun et al. | |
| 2014/0078352 A1 | 3/2014 | Iwai | |
| 2014/0098359 A1 | 4/2014 | Gross et al. | |
| 2014/0152801 A1 | 6/2014 | Fine et al. | |
| 2014/0236494 A1 | 8/2014 | Kolandaivelu et al. | |
| 2014/0293281 A1 | 10/2014 | Yamamoto et al. | |
| 2014/0323325 A1 | 10/2014 | Beal et al. | |
| 2014/0353522 A1 | 12/2014 | Wu et al. | |
| 2014/0376816 A1 | 12/2014 | Lagae et al. | |
| 2015/0182178 A1 | 7/2015 | Baturin et al. | |
| 2015/0192767 A1 | 7/2015 | Li et al. | |
| 2015/0198584 A1 | 7/2015 | Rajwa et al. | |
| 2015/0233703 A1 | 8/2015 | Martini et al. | |
| 2015/0268244 A1 | 9/2015 | Cho et al. | |
| 2015/0276387 A1 | 10/2015 | Kletter et al. | |
| 2015/0377783 A1 | 12/2015 | Kumer | |
| 2016/0005351 A1 * | 1/2016 | Jeon | G09G 3/2085 345/204 |
| 2016/0026900 A1 | 1/2016 | Ando | |
| 2016/0033328 A1 | 2/2016 | Walters | |
| 2016/0046958 A1 | 2/2016 | Eberwine et al. | |
| 2016/0069919 A1 | 3/2016 | Holmes et al. | |
| 2016/0125615 A1 | 5/2016 | Shigaki et al. | |
| 2016/0131891 A1 | 5/2016 | Higaki | |
| 2016/0169786 A1 | 6/2016 | Albitar et al. | |
| 2016/0223453 A1 | 8/2016 | Jalali et al. | |
| 2016/0231549 A1 | 8/2016 | Bosworth et al. | |
| 2016/0258856 A1 | 9/2016 | Kim et al. | |
| 2016/0258901 A1 | 9/2016 | Kang et al. | |
| 2016/0327779 A1 | 11/2016 | Hillman et al. | |
| 2016/0370266 A1 | 12/2016 | White et al. | |
| 2017/0045437 A1 | 2/2017 | Ishimaru | |
| 2017/0045451 A1 | 2/2017 | Nolan et al. | |
| 2017/0052106 A1 | 2/2017 | Hennig et al. | |
| 2017/0058361 A1 | 3/2017 | Ogawa et al. | |
| 2017/0082531 A1 | 3/2017 | Okada et al. | |
| 2017/0184483 A1 * | 6/2017 | Bartels | G01N 15/1468 |
| 2017/0212028 A1 | 7/2017 | Correia De Matos Nolasco Lamas et al. | |
| 2017/0221194 A1 | 8/2017 | Ebstein | |
| 2017/0227466 A1 * | 8/2017 | Lo | G01N 21/53 |
| 2017/0322137 A1 | 11/2017 | Feher et al. | |
| 2017/0328826 A1 | 11/2017 | Diebold et al. | |
| 2017/0332933 A1 | 11/2017 | Krishnaswamy et al. | |
| 2018/0052154 A1 | 2/2018 | Stoner et al. | |
| 2018/0127823 A1 | 5/2018 | Shekhar et al. | |
| 2018/0246030 A1 | 8/2018 | Ota et al. | |
| 2018/0251833 A1 | 9/2018 | Daugharthy et al. | |
| 2018/0327699 A1 | 11/2018 | Ota et al. | |
| 2019/0339380 A1 | 11/2019 | Marks | |
| 2019/0355440 A1 * | 11/2019 | Ramjeet | G16B 40/00 |
| 2019/0383719 A1 * | 12/2019 | Corbett | G01N 15/0211 |
| 2020/0027020 A1 | 1/2020 | Kamesawa et al. | |
| 2021/0003498 A1 | 1/2021 | Ota et al. | |
| 2021/0080382 A1 * | 3/2021 | Alfano | G02B 21/086 |
| 2021/0161385 A1 * | 6/2021 | Ben-Yakar | G02B 21/10 |
| 2021/0190669 A1 | 6/2021 | Ota et al. | |
| 2021/0310053 A1 | 10/2021 | Sugimoto | |
| 2022/0317020 A1 | 10/2022 | Nakagawa | |
| 2023/0012588 A1 | 1/2023 | Imai et al. | |
| 2023/0237789 A1 | 7/2023 | Ota et al. | |
| 2024/0133792 A1 | 4/2024 | Ota et al. | |

(56) References Cited

U.S. PATENT DOCUMENTS

| | | | |
|---|---|---|---|
| 2024/0241038 A1 | 7/2024 | Ota et al. | |
| 2024/0303980 A1 | 9/2024 | Ota et al. | |

FOREIGN PATENT DOCUMENTS

| | | | |
|---|---|---|---|
| CN | 101320252 A | 12/2008 | |
| CN | 101714212 A | 5/2010 | |
| CN | 101925809 A | 12/2010 | |
| CN | 101939633 A | 1/2011 | |
| CN | 102272580 A | 12/2011 | |
| CN | 102331411 A | 1/2012 | |
| CN | 102495467 A | 6/2012 | |
| CN | 102890049 A | 1/2013 | |
| CN | 103582809 A | 2/2014 | |
| CN | 103604737 A | 2/2014 | |
| CN | 103837461 A | 6/2014 | |
| CN | 103930768 A | 7/2014 | |
| CN | 103942415 A | 7/2014 | |
| CN | 104136907 A | 11/2014 | |
| CN | 104154878 A | 11/2014 | |
| CN | 104200114 A | 12/2014 | |
| CN | 104736995 A | 6/2015 | |
| CN | 104849874 A | 8/2015 | |
| CN | 105005053 A | 10/2015 | |
| CN | 105044897 A | 11/2015 | |
| CN | 105181649 A | 12/2015 | |
| CN | 105223582 A | 1/2016 | |
| CN | 105574536 A | 5/2016 | |
| CN | 105579828 A | 5/2016 | |
| CN | 105651656 A | 6/2016 | |
| CN | 105849275 A | 8/2016 | |
| CN | 106068520 A | 11/2016 | |
| CN | 106097437 A | 11/2016 | |
| CN | 106267241 A | 1/2017 | |
| CN | 106295251 A | 1/2017 | |
| CN | 106520535 A | 3/2017 | |
| CN | 108700500 A | 10/2018 | |
| CN | 109297888 A | 2/2019 | |
| EP | 2602612 A1 | 6/2013 | |
| EP | 2673618 A1 | 12/2013 | |
| EP | 3264031 A1 | 1/2018 | |
| EP | 3372985 A1 | 9/2018 | |
| EP | 3499201 A1 | 6/2019 | |
| EP | 3584564 A1 | 12/2019 | |
| EP | 3807005 A1 | 4/2021 | |
| EP | 4306931 A2 | 1/2024 | |
| JP | S613032 A | 1/1986 | |
| JP | S6279329 A | 4/1987 | |
| JP | H01118747 A | 5/1989 | |
| JP | H03216553 A | 9/1991 | |
| JP | H06102152 A | 4/1994 | |
| JP | H07270302 A | 10/1995 | |
| JP | H07270314 A | 10/1995 | |
| JP | H07325026 A | 12/1995 | |
| JP | H09311102 A | 12/1997 | |
| JP | 2002116133 A | 4/2002 | |
| JP | 3444509 B2 | 9/2003 | |
| JP | 2003526091 A | 9/2003 | |
| JP | 2004150832 A | 5/2004 | |
| JP | 2004279032 A | 10/2004 | |
| JP | 2004286731 A | 10/2004 | |
| JP | 2005069832 A | 3/2005 | |
| JP | 2006520893 A | 9/2006 | |
| JP | 2007048172 A | 2/2007 | |
| JP | 2007281634 A | 10/2007 | |
| JP | 2008523402 A | 7/2008 | |
| JP | 2008539425 A | 11/2008 | |
| JP | 2009115672 A | 5/2009 | |
| JP | 2009180724 A | 8/2009 | |
| JP | 2009180725 A | 8/2009 | |
| JP | 2009210465 A | 9/2009 | |
| JP | 2010203949 A | 9/2010 | |
| JP | 4679507 B2 | 4/2011 | |
| JP | 2011099848 A | 5/2011 | |
| JP | 2011141444 A | 7/2011 | |
| JP | 2011229409 A | 11/2011 | |
| JP | 2011229410 A | 11/2011 | |
| JP | 2012500385 A | 1/2012 | |
| JP | 2013015357 A | 1/2013 | |
| JP | 2013128438 A | 7/2013 | |
| JP | 2013167582 A | 8/2013 | |
| JP | 2013178232 A | 9/2013 | |
| JP | 2013210287 A | 10/2013 | |
| JP | 2014013234 A | 1/2014 | |
| JP | 5418386 B2 | 2/2014 | |
| JP | 5464244 B2 | 4/2014 | |
| JP | 5534214 B2 | 6/2014 | |
| JP | 5574407 B2 | 8/2014 | |
| JP | 2014175819 A | 9/2014 | |
| JP | 2014190748 A | 10/2014 | |
| JP | 2015036799 A | 2/2015 | |
| JP | 2015052663 A | 3/2015 | |
| JP | 2015512029 A | 4/2015 | |
| JP | 2016057172 A | 4/2016 | |
| JP | 2016510418 A | 4/2016 | |
| JP | 2016073210 A | 5/2016 | |
| JP | 2016090292 A | 5/2016 | |
| JP | 2016099685 A | 5/2016 | |
| JP | 2016517526 A | 6/2016 | |
| JP | 2016524703 A | 8/2016 | |
| JP | 2016192007 A | 11/2016 | |
| JP | 2016197111 A | 11/2016 | |
| JP | 2017058361 A | 3/2017 | |
| JP | 2018511060 A | 4/2018 | |
| JP | 2018132501 A | 8/2018 | |
| JP | WO2018181458 A1 | 2/2020 | |
| WO | WO-03048345 A1 | 6/2003 | |
| WO | WO-2006080314 A1 | 8/2006 | |
| WO | WO-2006103920 A1 | 10/2006 | |
| WO | WO-2006115663 A2 | 11/2006 | |
| WO | WO-2006127967 A2 | 11/2006 | |
| WO | WO-2007067999 A2 | 6/2007 | |
| WO | WO-2010017001 A2 | 2/2010 | |
| WO | WO-2010032452 A1 | 3/2010 | |
| WO | WO-2011028109 A1 | 3/2011 | |
| WO | WO-2011049965 A1 | 4/2011 | |
| WO | WO-2012068287 A2 | 5/2012 | |
| WO | WO-2012086195 A1 | 6/2012 | |
| WO | WO-2012144886 A1 | 10/2012 | |
| WO | WO-2012147804 A1 | 11/2012 | |
| WO | WO-2013066896 A1 | 5/2013 | |
| WO | WO-2013101675 A2 | 7/2013 | |
| WO | WO-2014127379 A1 | 8/2014 | |
| WO | WO-2014144585 A1 | 9/2014 | |
| WO | WO-2014146062 A2 | 9/2014 | |
| WO | WO-2015067734 A1 | 5/2015 | |
| WO | WO-2015068834 A1 | 5/2015 | |
| WO | WO-2015148560 A1 | 10/2015 | |
| WO | WO-2016038796 A1 | 3/2016 | |
| WO | WO-2016073985 A1 | 5/2016 | |
| WO | WO-2016085571 A2 | 6/2016 | |
| WO | WO-2016130489 A1 | 8/2016 | |
| WO | WO-2016136801 A1 | 9/2016 | |
| WO | WO-2017046988 A1 | 3/2017 | |
| WO | WO-2017073737 A1 | 5/2017 | |
| WO | WO-2017121896 A1 | 7/2017 | |
| WO | WO-2017164936 A1 | 9/2017 | |
| WO | WO-2018034241 A1 | 2/2018 | |
| WO | WO-2018126205 A1 | 7/2018 | |
| WO | WO-2018151206 A1 | 8/2018 | |
| WO | WO-2018199080 A1 | 11/2018 | |
| WO | WO-2019241443 A1 | 12/2019 | |
| WO | WO-2020081819 A1 | 4/2020 | |
| WO | WO-2021132484 A1 | 7/2021 | |
| WO | WO-2021200911 A1 | 10/2021 | |
| WO | WO-2021200960 A1 | 10/2021 | |

OTHER PUBLICATIONS

EP21779172.2 European Supplementary Search Report dated Mar. 14, 2024.

U.S. Appl. No. 17/847,478 Corrected Notice of Allowability dated Nov. 18, 2024.

(56) References Cited

OTHER PUBLICATIONS

U.S. Appl. No. 18/238,368 Notice of Allowance dated Dec. 11, 2024.
U.S. Appl. No. 18/512,356 Office Action dated Dec. 12, 2024.
JP2023-172195 Notice of Allowance dated Dec. 16, 2024, and an English translation.
Van Der Pol, Edwin., et al. Absolute sizing and label-free identification of extracellular vesicles by flow cytometry. Nanomedicine 14(3):801-810 (2018).
Abolbashari, Mehrdad, et al. High dynamic range compressive imaging: a programmable imaging system. Optical Engineering, vol. 51, No. 7, 071407-1-071407-8 (2012).
Adachi, Hioraki, et al. Use of Ghost Cytometry to Differentiate Cells with Similar Gross Morphologic Characteristics. ARXIV.Org., 1-11, (2019).
Adjouadi, Malek. et al. Multidimensional Pattern Recognition and Classification of White Blood Cells Using Support Vector Machines. Particle & Particle Systems Characterization 22(2):107-118 (2005).
Baroud, Charles N., et al. Dynamics of microfluidic droplets. Lab on a Chip, vol. 10, 2032- 2045 (2010).
Bruggner, Robert V. et al. Automated Identification of Stratifying Signatures in Cellular Subpopulations. Proceedings of the National Academy of Sciences 111(26):E2770-E2777 (2014).
Choi, Kerkil, et al. Compressive holography of diffuse objects. Applied Optics, vol. 49, No. 34, 1-10 (2010).
CN201680011390.X Office Action dated Apr. 9, 2020, and an English translation.
CN201680011390.X Office Action dated Nov. 29, 2019, and an English translation.
CN201680011390.X Office Action with Search Report dated Mar. 1, 2019, and a partial English translation.
CN201680062987.7 Office Action dated Dec. 30, 2019.
CN201680062987.7 Office Action with Search Report dated Dec. 30, 2019, and a Partial English translation.
CN201680062987.7 Office Action with Search Report dated Mar. 11, 2021, and a Partial English translation.
CN201680062987.7 Office Action with Search Report dated Sep. 10, 2020, and a Partial English translation.
CN201780062816.9 Office Action dated Jul. 17, 2020.
CN201880012120.X Office Action dated Dec. 23, 2021.
CN201880021362.5 Chinese Office Action with Search Report dated Mar. 31, 2023.
CN201980053558.7 Office Action dated Aug. 23, 2022, and an English translation.
CN201980053558.7 Office Action with Search report dated Dec. 2, 2021, and a partial English translation.
CN202111319130.8 Search Report dated Dec. 27, 2023.
Duarte, Marco, et al. Single-Pixel Imaging via Compressive Sampling. I EEE Signal Processing Magazine, vol. 25, 83-91 (2008).
EP16755545.7 Office Action dated Jun. 24, 2020.
EP16859965.2 European Search Report dated Aug. 16, 2019.
EP16859965.2 Office Action dated Jul. 18, 2022.
EP17841464.5 Extended European Search Report dated Jan. 28, 2020.
EP18753550.5 Extended European Search Report dated Feb. 19, 2020.
EP18775495.7 Extended Search Report dated Dec. 18, 2020.
EP19819019.1 Extended European Search Report dated Feb. 8, 2022.
EP19873817.1 Extended European Search Report dated Jul. 15, 2022.
EP20160755545.7 Extended European Search Report dated Aug. 24, 2018.
EP20160859965.2 Partial European Search Report dated May 6, 2019.
EP20907648.8 Partial Supplementary European Search Report dated Dec. 14, 2023.
EP23195563.4 Extended European Search Report dated Jan. 9, 2024.
Han, Yuanyuan, et al. Imaging Cells in Flow Cytometer Using Spatial-Temporal Transformation. Scientific Reports 5:13267, 1-10 (2015).
Hassan, S. Sakira, et. al. Flow Cytometry-Based Classification in Cancer Research: A View on Feature Selection, Cancer Informatics, vol. 14, 75-85 (2015).
Hennig, Holger, et. al. An open-source solution for advanced imaging flow cytometry data analysis using machine learning. Methods, vol. 112, 201-210 (2017).
Horisaki, Ryoichi, et al. Single-pixel compressive diffractive imaging. Applied Optics, vol. 56, No. 5, 1353-1357 (2017).
Horisaki, Ryoichi, et al. Single-pixel compressive diffractive imaging with structured illumination. Applied Optics, vol. 56 No. 14, 4085-4089 (2017).
Horisaki, Ryoichi, et al. Single-shot phase imaging with a coded aperture. Optics Letters, vol. 39, No. 22, 1-4 (2014).
Joung, Julia, et al. Genome-scale CRISPR-Cas9 Knockout and Transcriptional Activation Screening. Nature Protocols, vol. 12, 828-863 (2017).
JP2017_502419 Office Action dated Aug. 21, 2018, and an English translation.
JP2017_502419 Office Action dated May 7, 2019, and an English translation.
JP2017_547891 Office Action dated Apr. 27, 2021, and an English translation.
JP2017_547891 Office Action dated Aug. 31, 2021, and an English translation.
JP2017_547891 Office Action dated Oct. 6, 2020, and an English translation.
JP2019-514527 Decision of Dismissal of Amendment dated Jul. 12, 2022.
JP2020-170808 Office Action dated Sep. 21, 2021.
JP2021-159163 Office Action dated Oct. 4, 2022.
JP2021_518859 Office Action dated Jun. 5, 2023, and an English translation.
JP2021_518859 Office Action dated Sep. 4, 2023, and an English translation.
JP2021_521403 Office Action dated May 7, 2024, and an English translation.
JP2021_521403 Office Action dated Sep. 4, 2023, and an English translation.
JP2021_567626 Office Action dated May 7, 2024, and an English translation.
JP2022-170844 Office Action dated Aug. 22, 2023.
JP2023_172195 Office Action dated Jun. 10, 2024, and an English translation.
Katkovnik, Vladimir, et al. Compressive sensing computational ghost imaging, 1-62 (2012). Retrieved from: https://pdfs.semanticscholar.org/4568/1fbc1143924f13c1800b8c1008be6c1241d8.pdf.
Katkovnik, Vladimir, et al. Compressive sensing computational ghost imaging. Journal of the Optical Society of America, vol. 29, No. 8, 1556-1567 (2012).
Katkovnik, Vladimir, et al. Phase retrieval via spatial light modulator phase modulation in 4f optical setup: numerical inverse imaging with sparse regularization for phase and amplitude. Journal of the Optical Society of America, vol. 29, No. 1, 105-116 (2012).
Katz, Ori, et al. Compressive ghost imaging. Applied Physics Letters, vol. 95, 2-5 (2009).
Krstenansky, John L., et al. Short model peptides having a high alpha-helical tendency: design and solution properties. Federation of European Biochemical Societies, vol. 242, No. 2, 409-413 (1989).
Lee, Byounghyo, et al. Single-shot Phase Retrieval via Fourier ptychographic microscopy. Optical Society of America, vol. 5, No. 8, 976-983 (2018).
Lee, Gyemin, et al. Transfer Learning for Auto-gating of Flow Cytometry Data, JMLR: Workshop and Conference Proceedings, Workshop on Unsupervised and Transfer Learning, vol. 27, 155-165 (2012).
Li, Enrong. et al. Ghost Imaging of a Moving Target With an Unknown Constant Speed. Applied Physics Letters 104:251120-1-251120-3 (2014).

(56) References Cited

OTHER PUBLICATIONS

Li, Xiaohui, et al. Ghost imaging for an axially moving target with an unknown constant speed. Photonics Research, vol. 3, No. 4, 153-157 (2015).

Liu, Ziji, et al. Real-time brightfield, darkfield, and phase contrast imaging in a light-emitting diode array microscope. Journal of Biomedical Optics, vol. 19, No. 10, 106002-1-106002-5 (2014).

Liutkus, Antoine, et al. Imaging With Nature: A Universal Analog Compressive Imager Using a Multiply Scattering Medium. Retrieved from: http://arxiv.org/vc/arxiv/papers/1309/1309.0425v1.pdf, arXiv. org, 1-15 (2013).

Liutkus, Antoine, et al. Imaging With Nature: Compressive Imaging Using a Multiply Scattering Medium. Scientific Reports, vol. 4, 1-13 (2014).

Mair, Florian et al. The End of Gating? An Introduction to Automated Analysis of High Dimensional Cytometry Data. European Journal of Immunology 46(1):34-43 (2016). Published Online Nov. 30, 2015.

Meehan, Stephen et al. AutoGate: Automating Analysis of Flow Cytometry Data. Immunologic Research 58(2-3):218-223 (2014).

Ni, Wanmao, et. al. Discrimination of malignant neutrophils of chronic myelogenous leukemia from normal neutrophils by support vector machine. Computers in Biology and Medicine, vol. 43, 1192-1195 (2013).

Nitta, Nao. et al. Intelligent Image-Activated Cell Sorting. Cell 175(1):266-276.e1-e13 (2018).

Ota, Sadao, et al. Ghost Cytometry. Science, vol. 360, 1246-1251 (2018).

PCT/JP2016/055412 International Search Report and Written Opinion dated May 17, 2016.

PCT/JP2016/082089 International Search Report and Written Opinion dated Jan. 24, 2017.

PCT/JP2017/029156 International Search Report dated Oct. 31, 2017.

PCT/JP2018/005237 International Search Report dated May 1, 2018.

PCT/JP2018/012708 International Search Report and Witten opinion dated Jul. 3, 2018.

PCT/JP2018/016584 International Search Report dated Jul. 17, 2018.

PCT/JP2020/048503 International Preliminary Report on Patentability dated Jul. 7, 2022.

PCT/JP2020/048503 International Search Report dated Mar. 9, 2021.

PCT/JP2021/013478 International Preliminary Report on Patentability dated Oct. 13, 2022.

PCT/JP2021/013564 International Search Report and Written Opinion dated Jun. 22, 2021.

PCT/US2019/036849 International Search Report and Written Opinion dated Sep. 19, 2019.

PCT/US2019/056743 International Search Report and Written Opinion dated Feb. 7, 2020.

Pian, Qi, et al. Time-resolved Hyperspectral Single-pixel Camera Implementation for Compressive Wide-Field Fluorescence Lifetime Imaging. Proceedings of the International Society for Optical Engineering, vol. 9701, 970115-1-970115-6 (2016).

Rajwa, Bartek et al. Automated Classification of Bacterial Particles in Flow by Multiangle Scatter Measurement and Support Vector Machine Classifier. Cytometry Part A, vol. 73A, Issue 4, 369-379 (2008).

Rota, Paolo, et. al. The Role of Machine Learning in Medical Data Analysis. A Case Study: Flow Cytometry. Proceedings of the 11th Joint Conference on Computer Vision, Imaging and Computer Graphics Theory and Applications, vol. 3, 305-312 (2016).

Shalem, Ophir, et al. Genome-Scale CRISPR-Cas9 Knockout Screening in Human Cells. Science, vol. 343, 84-87 (2014).

Shibuya, Kyuki, et al. Monomolecular fluorescence imaging method based on ghost imaging by using circulatory pattern (second report). Proceedings of Japan Science and Technology Agency, Semestrial Meeting, 863-864 (2014).

Sosik, Heidi M., et. al. Automated taxonomic classification of phytoplankton sampled with imaging-in-flow cytometry. Limnology and Oceanography: Methods, vol. 5, 204-216 (2007).

Tsujioka, Katsumi, et al. Three-dimensional shape measurement system using optical spatial modulator and zoom camera. Fifth International Symposium on Instrumentation and Control Technology, vol. 5253, 504-507 (2003).

Ugawa, Masashi, et al. High-throughput optofluidic particle profiling with morphological and chemical specificity. Optics Letters, vol. 40, No. 20, 4803-4806 (2015).

U.S. Appl. No. 15/552,438 Notice of Allowance dated Jul. 17, 2020.
U.S. Appl. No. 15/552,438 Notice of Allowance dated Jun. 16, 2020.
U.S. Appl. No. 15/552,438 Office Action dated Apr. 12, 2019.
U.S. Appl. No. 15/552,438 Office Action dated Aug. 9, 2018.
U.S. Appl. No. 15/552,438 Office Action dated Nov. 12, 2019.
U.S. Appl. No. 15/771,180 Corrected Notice of Allowability dated Jul. 21, 2021.
U.S. Appl. No. 15/771,180 Notice of Allowance dated May 17, 2021.
U.S. Appl. No. 15/771,180 Office Action dated Apr. 23, 2019.
U.S. Appl. No. 15/771,180 Office Action dated Jul. 30, 2020.
U.S. Appl. No. 15/771,180 Office Action dated Jun. 8, 2020.
U.S. Appl. No. 15/771,180 Office Action dated Nov. 13, 2019.
U.S. Appl. No. 16/272,569 Notice of Allowance dated Aug. 12, 2020.
U.S. Appl. No. 16/272,569 Office Action dated Apr. 16, 2020.
U.S. Appl. No. 16/542,257 Notice of Allowance dated Aug. 30, 2022.
U.S. Appl. No. 16/542,257 Notice of Allowance dated Nov. 17, 2022.
U.S. Appl. No. 16/542,257 Office Action dated Nov. 16, 2021.
U.S. Appl. No. 16/584,535 Office Action dated Aug. 21, 2024.
U.S. Appl. No. 16/584,535 Office Action dated Dec. 4, 2023.
U.S. Appl. No. 16/584,535 Office Action dated Feb. 18, 2022.
U.S. Appl. No. 16/584,535 Office Action dated Jun. 14, 2023.
U.S. Appl. No. 16/584,535 Office Action dated Sep. 12, 2022.
U.S. Appl. No. 16/663,182 Notice of Allowance dated Dec. 15, 2022.
U.S. Appl. No. 16/663,182 Notice of Allowance dated Jan. 11, 2023.
U.S. Appl. No. 16/663,182 Office Action dated Apr. 27, 2022.
U.S. Appl. No. 16/936,138 Notice of Allowance dated Apr. 14, 2021.
U.S. Appl. No. 16/936,138 Notice of Allowance dated Jun. 8, 2021.
U.S. Appl. No. 16/936,138 Office Action dated Oct. 22, 2020.
U.S. Appl. No. 17/089,028 Notice of Allowance dated Apr. 19, 2022.
U.S. Appl. No. 17/089,028 Office Action dated Nov. 24, 2021.
U.S. Appl. No. 17/115,657 Notice of Allowance dated Aug. 4, 2023.
U.S. Appl. No. 17/115,657 Notice of Allowance dated Jun. 14, 2023.
U.S. Appl. No. 17/115,657 Office Action dated Jan. 20, 2023.
U.S. Appl. No. 17/231,725 Office Action dated Aug. 27, 2024.
U.S. Appl. No. 17/231,725 Office Action dated Feb. 26, 2024.
U.S. Appl. No. 17/336,720 Notice of Allowance dated Oct. 27, 2022.
U.S. Appl. No. 17/336,720 Office Action dated Apr. 14, 2022.
U.S. Appl. No. 17/351,117 Corrected Notice of Allowability dated Nov. 28, 2022.
U.S. Appl. No. 17/351,117 Corrected Notice of Allowability dated Sep. 23, 2022.
U.S. Appl. No. 17/351,117 Notice of Allowance dated Sep. 15, 2022.
U.S. Appl. No. 17/351,117 Office Action dated Apr. 22, 2022.
U.S. Appl. No. 17/847,478 Notice of Allowance dated Nov. 6, 2024.
U.S. Appl. No. 17/847,478 Office Action dated May 15, 2024.
U.S. Appl. No. 17/935,707 Office Action dated Aug. 9, 2024.
U.S. Appl. No. 18/056,432 Notice of Allowance dated Oct. 18, 2023.
U.S. Appl. No. 18/056,432 Office Action dated May 9, 2023.
U.S. Appl. No. 18/059,846 Notice of Allowance dated Aug. 22, 2023.
U.S. Appl. No. 18/059,846 Notice of Allowance dated Sep. 6, 2023.

(56) References Cited

OTHER PUBLICATIONS

U.S. Appl. No. 18/059,846 Office Action dated May 17, 2023.
U.S. Appl. No. 18/152,354 Notice of Allowance dated Aug. 23, 2023.
U.S. Appl. No. 18/152,354 Office Action dated Jul. 3, 2023.
U.S. Appl. No. 18/238,368 Notice of Allowance dated Apr. 3, 2024.
U.S. Appl. No. 18/238,368 Office Action dated Aug. 15, 2024.
U.S. Appl. No. 18/511,920 Notice of Allowance dated Oct. 18, 2024.
U.S. Appl. No. 18/511,920 Office Action dated Jul. 5, 2024.
U.S. Appl. No. 18/512,356 Office Action dated May 28, 2024.
Van Meir, Erwin G., et al. Single cell monitoring of growth arrest and morphological changes induced by transfer of wild-type p53 alleles to glioblastoma cells. Proceedings of the National Academy of Science, Genetics, vol. 92, 1008-1012 (1995).
Voigt, Andrew P. et al. Consistent Quantitative Gene Product Expression:# 1. Automated Identification of Regenerating Bone Marrow Cell Populations Using Support Vector Machines. Cytometry Part A 89(11):978-986 (2016).
Wang, Xianwen. Research on Automatic Identification Algorithm of Cell Groups in Flow cytometry Data Based on Skew T-Hybrid Model. China Doctoral Dissertation Full text Database Information Technology Edition, vol. 11, 1-123 (2015).
Wu, Jiani. Analysis of High Dimentional Mass Cytometry Data Based on Support Vector Machine and Its Application in the Early Diagnosis of Acute Myelocytic Leukemia. Chinese Thesis for Master Degree Full Text Database, Medical and Health Technology Edition, No. 1, 1-79 (2016).
Wu, Jianjun, et al. Expression of an exogenous eukaryotic DNA methyltransferase gene induces transformation of NIH 3T3 cells. Proceedings of the National Academy of Science, Medical Sciences, vol. 90, 8891-8895 (1993).
Zhang, Leihong, et al. Study on Ghost Imaging via Compressive Sensing for a Reflected Object. Optik 124(16):2334-2338 (2013).
Zhou et al., Focusing on moving targets through scattering samples, 2014, Optica, vol. 1(4); pp. 227-232.
CN202180025132.8 Office Action with Search Report dated Apr. 1, 2025, and a partial English translation.

\* cited by examiner

FLOW CYTOMETER

CROSS-REFERENCE

This application is a continuation application of International Application No. PCT/JP2021/013478, filed Mar. 30, 2021, which claims priority to Japanese Application No. 2020-065940, filed Apr. 1, 2020, each of which is entirely incorporated herein by reference.

TECHNICAL FIELD

The present invention relates to a flow cytometer.

BACKGROUND ART

In recent years, there has been an active movement toward practical use of new treatment methods such as regenerative medicine using stem cells such as induced pluripotent stem (iPS) cells and immunotherapy using a chimeric antigen receptor T cell, and there is a strong demand for cell-by-cell analysis of individual cells contained in cell groups.

As a cytometry technique in a case of performing such an analysis by one cell (single cell), a flow cytometry method has been proposed. The flow cytometry method is a technique for dispersing individual cells in a fluid, allowing the fluid to flow down finely and performing an optical analysis, and an apparatus using the technique is called a flow cytometer (Patent Document 1). In the flow cytometry method, an observation object can be evaluated by irradiating excitation light while fine particles such as cells to be observed flow down in a flow path at high speed and obtaining a total amount of fluorescence brightness or scattered light emitted from each of the cells.

However, in a measurement method based on limited information such as the total amount of fluorescence brightness or scattered light, it is difficult to capture and evaluate two-dimensional spatial characteristics of observation object, such as cell morphology information and intracellular molecular localization. As a flow cytometry methodology capable of acquiring high-resolution information that can describe the morphology of cells in more detail, a method in which structured illumination, which is structured (encoded) illumination, is irradiated to an observation object such as a cell to detect fluorescence or other modulated signals of optical characteristics emitted from the observation object has been proposed. By using this method, it is possible to obtain more abundant and detailed cell morphology information as compared with conventional flow cytometry that obtains the total amount of fluorescence brightness and scattered light. As an example of such a method, for example, a ghost cytometry technique is known (Patent Document 2).

It is known that, among the modulated signals, particularly, scattered light emitted from cells that have been irradiated with light is related to morphological information such as cell shape and internal structure, and one piece of morphological information can be obtained according to a direction in which the scattered light is scattered. Thus, also in flow cytometry, a method in which cells are measured with a combination of fluorescence and scattered light and desired cells contained in a sample are identified and sorted based on the measurement results is known (Patent Document 3).

CITATION LIST

Patent Literature

[Patent Document 1]
  Japanese Unexamined Patent Application, First Publication No. 2011-99848

[Patent Document 2]
  PCT International Publication No. WO2017/073737

[Patent Document 1]
  Japanese Unexamined Patent Application, First Publication No. 2016-73210

SUMMARY OF INVENTION

Technical Problem

The present invention has been made in view of the above points and provides a methodology for detecting modulated light by an observation object such as scattered light using a simpler mechanism than in the past in flow cytometry using structured illumination. In flow cytometry using structured illumination as described above, since it is necessary to irradiate the observation object with structured illumination, it is difficult to detect scattered light scattered in each direction while direct light or reflected light incident to a detector is avoided. Thus, no method of providing a methodology for detecting scattered light that realizes a sufficiently high signal-to-noise ratio by a simple mechanism in flow cytometry using structured illumination has been proposed so far.

Solution to Problem

The present invention has been made to solve the above problems, and one aspect of the present invention is a flow cytometer including a flow path through which an observation object flows with a fluid; an optical illumination system including a light source, a spatial optical modulation device configured to modulate light emitted from the light source, and a first optical element configured to form an image of the light modulated by the spatial optical modulation device in the flow path; and an optical detection system including a first light detector configured to detect the light imaged by the first optical element and modulated by the observation object flowing in the flow path, wherein the optical illumination system further includes a first spatial filter disposed in a first optical path between the light source and an image position of the light imaged in the flow path by the first optical element and having a first region which hinders traveling of the light emitted from the light source towards the observation object, the optical detection system further includes a second spatial filter disposed in a second optical path between the first light detector and the image position and having a second region which directs the light modulated by the observation object towards the first light detector, and the position of the first region and the position of the second region are in a substantially optically conjugate relationship.

Further, according to one aspect of the present invention, in the flow cytometer, when the first spatial filter is not provided, a region in which the second region is overlapped with a region where light modulated by the spatial optical modulation device passes through the observation object and irradiates the second spatial filter may be substantially the same as or be included in a region occupied in the second spatial filter by an image of a region formed in the second spatial filter, wherein the region formed in the second spatial filter is a region in which the first region is overlapped with a region where the first spatial filter is irradiated with the light modulated by the spatial optical modulation device.

Further, according to one aspect of the present invention, in the flow cytometer, the light modulated by the observation object flowing in the flow path and detected by the first light detector may be scattered light or diffracted light.

Further, according to one aspect of the present invention, in the flow cytometer, the first region may hinder traveling of the light emitted from the light source toward the observation object by using one of transmission, blocking, diffraction, and reflection of the light.

Further, according to one aspect of the present invention, in the flow cytometer, the whole or a part of a region opposing to the first region on a surface located on a side facing the image position among surfaces of the first spatial filter may be configured of a member which reflects scattered light in which the light emitted from the light source is scattered by the observation object, and the optical detection system may further include a second light detector which detects the scattered light reflected by the member.

Further, according to one aspect of the present invention, in the flow cytometer, the whole or a part of a region opposing to the first region on a surface located on a side facing the image position among surfaces of the first spatial filter may be configured of a member which transmits scattered light in which the light emitted from the light source is scattered by the observation object, and the optical detection system may further include a second light detector which detects the scattered light transmitted by the member.

Further, according to one aspect of the present invention, in the flow cytometer, the first spatial filter and the spatial optical modulation device may be integrally provided.

Further, according to one aspect of the present invention, in the flow cytometer, the first spatial filter may serve as the second spatial filter.

Further, according to one aspect of the present invention, in the flow cytometer, intensity or phase of light transmitted through the observation object is modulated when the light passes through the whole or a part of a region other than the second region in the second spatial filter, and the first light detector may detect a phase difference between the phase-modulated light which has passed through the region other than the second region and light which has passed through the second region of the light modulated by the observation object.

Further, according to one aspect of the present invention, the flow cytometer may further include a beam splitter disposed in the second optical path and configured to extract some of the light modulated by the observation object, a third spatial filter having a third region configured to transmit the modulated light extracted by the beam splitter, and a second light detector configured to detect the modulated light which has passed through the third region.

Advantageous Effects of Invention

According to the present invention, in flow cytometry using structured illumination, modulated light by an observation object can be detected by a mechanism simpler than that in the conventional case. According to the present invention, modulated light such as scattered light emitted from the observation object by illumination irradiation can be detected with a high signal-to-noise ratio, and detailed morphological information of the observation object can be acquired at a higher resolution than that in the conventional case. Thus, it is possible to separate an observation object such as a target cell at high speed based on morphological information in a non-invasive manner without labeling the observation object with a fluorescent label or the like (hereinafter, also referred to as label-free).

DESCRIPTION OF EMBODIMENTS

First Embodiment

Hereinafter, embodiments of the present invention will be described in detail with reference to the drawings.

Figure 1:
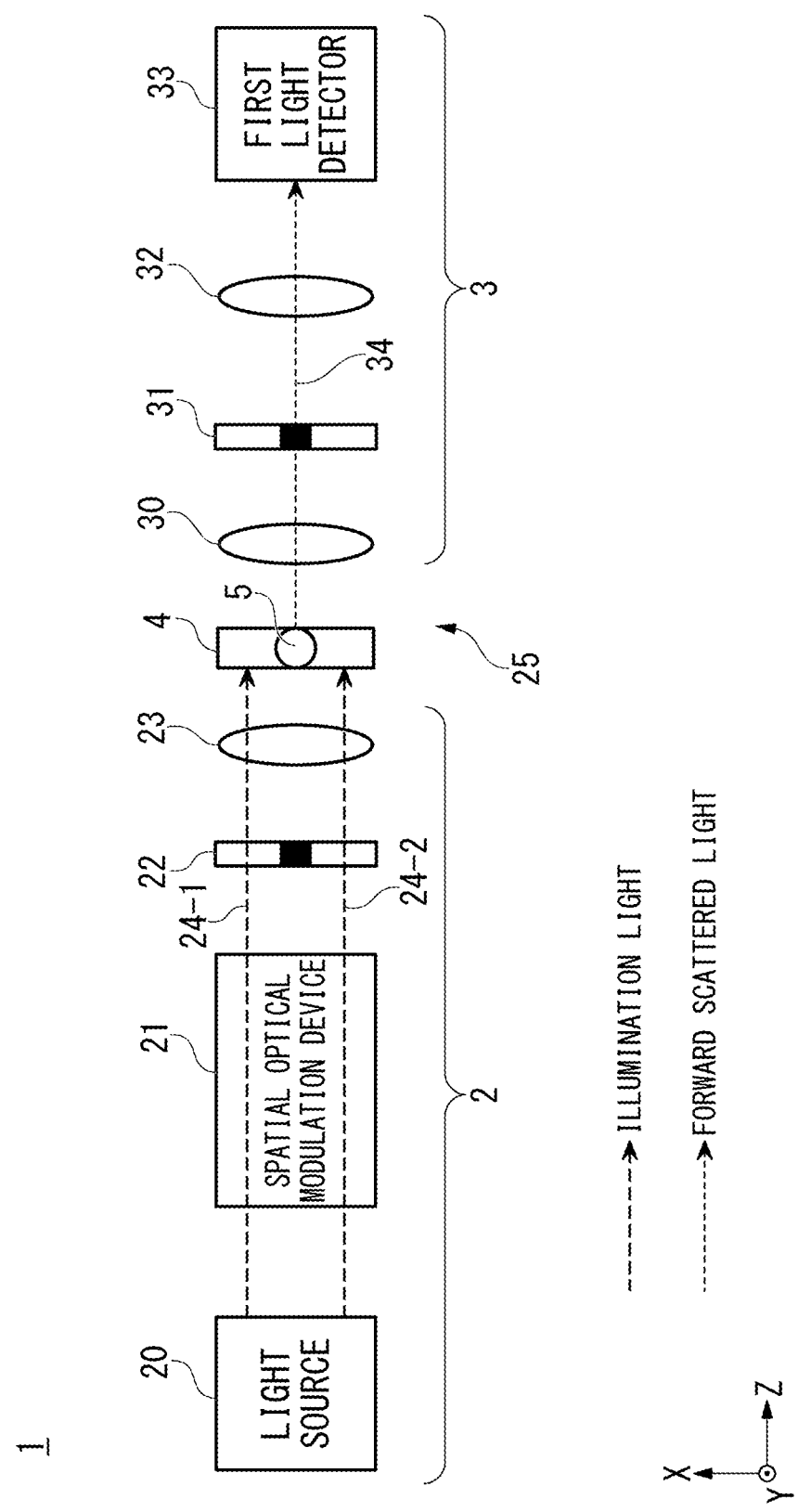
FIG. 1 is a diagram showing an example of a configuration of a flow cytometer according to a first embodiment of the present invention.

FIG. 1 is a diagram showing an example of a configuration of a flow cytometer 1 according to the present embodiment. The flow cytometer 1 includes a flow path (not shown), an optical illumination system 2, and an optical detection system 3. An observation object 5 can flow together with a fluid in the flow path. The observation object 5 is an object for acquiring morphological information and is, for example, a cell. The observation object 5 may be fine particles such as bacteria.

Here, FIG. 1 shows an xyz coordinate system as a three-dimensional Cartesian coordinate system. An x-axis direction is a lengthwise direction of the flow path. Further, a y-axis direction is a width direction of the flow path. Further, a z-axis direction is a direction orthogonal to the flow path and is a height direction of the flow path.

The optical illumination system 2 is an optical system for irradiating the observation object 5 with the structured illumination 4 in the flow path. In the flow cytometer 1, forward scattered light, in which the structured illumination 4 is scattered by the observation object 5, is detected by the optical detection system 3. The forward scattered light is light scattered in a positive direction of a z-axis in the scattered light from the observation object 5. In the flow cytometer 1, the scattered light is detected based on a principle of so-called dark field observation.

An optical path of the illumination light in the optical illumination system 2 is referred to as a first optical path 24. The first optical path 24 is parallel to the z-axis. In FIG. 1, as an example of the first optical path 24, a first optical path 24-1 and a first optical path 24-2 are shown. The optical illumination system 2 includes a light source 20, a spatial optical modulation device 21, a first spatial filter 22, and a first objective lens 23. The light source 20, the spatial optical modulation device 21, the first spatial filter 22, and the first objective lens 23 are provided on the first optical path 24 in this order in a direction in which the illumination light is directed toward the observation object 5 flowing through the flow path.

The light source 20 is, for example, a laser light source. The light source 20 emits illumination light which is coherent light as an example. The light source 20 may be a light source that emits incoherent light. Another example of the light source 20 is a semiconductor laser light source, and a light emitting diode (LED) light source.

The spatial optical modulation device 21 modulates lights emitted from the light source 20. The spatial optical modulation device 21 has a plurality of regions having different optical characteristics. With respect to the optical characteristics of incident light, the spatial optical modulation device 21 performs different modulation in two or more regions among the plurality of regions having different optical characteristics. The optical characteristics of incident light are, for example, characteristics relating to any one or more of intensity, wavelength, phase, and polarization state. The optical characteristics are not limited thereto. Further, the modulation is to change the above-described optical characteristics. The spatial optical modulation device 21 includes, for example, a diffractive optical element (DOE), a spatial light modulator (SLM), a digital micromirror device (DMD), a film in which a plurality of regions having different optical characteristics are printed on a surface thereof, and the like. When the illumination light emitted by the light source 20 is incoherent light, the spatial optical modulation device 21 is a DMD.

The first spatial filter 22 has a blocking region that blocks the light emitted from the light source 20 and a transmission region that transmits the light emitted from the light source 20. The first spatial filter 22 is disposed on the first optical path 24 which is an optical path between the light source 20 and an image position 25 in the flow path. Here, the image position 25 is the position of an image of light formed in the flow path by the first objective lens 23. The position of the image of light formed by the first objective lens 23 is the position at which the structured illumination 4 is imaged. An illumination pattern of structured illumination light irradiated to the observation object is constant and does not change during a measurement period of one observation object. The structured illumination 4 is a structured illumination pattern in which illumination light modulated by the spatial optical modulation device 21 is imaged by the first objective lens 23.

In the present embodiment, the first spatial filter 22 is provided, for example, between the spatial optical modulation device 21 and the image position 25 in the first optical path 24. As an example, the first spatial filter 22 is disposed substantially perpendicular to the first optical path 24 (that is, in the z-axis direction).

The first spatial filter 22 may be provided at any position between the spatial optical modulation device 21 and the image position 25 in the first optical path 24 as long as it is a position other than the image position 25. When the first spatial filter 22 is provided at the image position 25, the structured illumination 4 itself is missing, which is not preferable.

Figure 2:
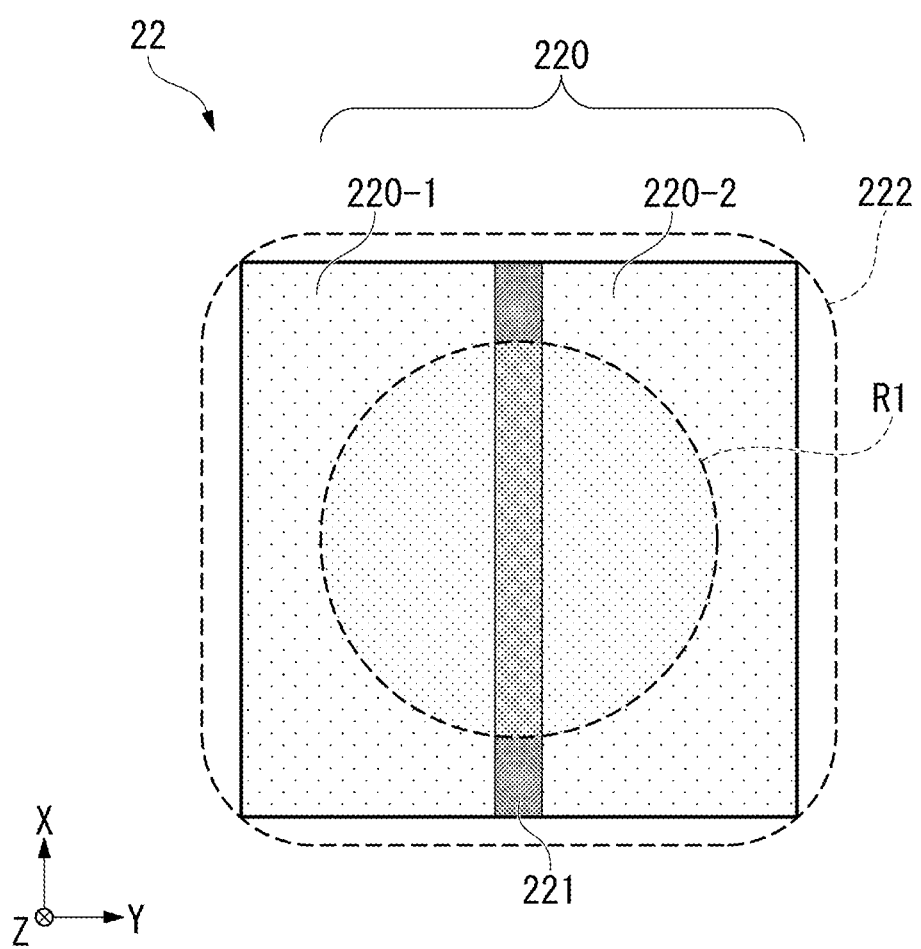
FIG. 2 is a diagram showing an example of a configuration of a first spatial filter included in the flow cytometer according to the first embodiment of the present invention.

Here, with reference to FIG. 2, a configuration of the first spatial filter 22 will be described. FIG. 2 is a diagram showing an example of the configuration of the first spatial filter 22 according to the present embodiment. As an example, the shape of the first spatial filter 22 is a quadrangle and a plate-like shape. FIG. 2 shows a plane 222 when the plate-like first spatial filter 22 is seen from the light source 20 side in the z-axis direction. A surface of the first spatial filter 22 on the light source 20 side is located on the plane 222.

An irradiation region R1 indicates a region to which the structured illumination light, which is the light from the light source 20 modulated by the spatial optical modulation device 21, is irradiated on the plane 222.

The surface of the first spatial filter 22 located on the plane 222 is divided into a transmission region 220 and a blocking region 221. In FIG. 2, the transmission region 220 of the first spatial filter 22 is separated by the blocking region 221 and consists of two unconnected regions, namely a transmission region 220-1 and a transmission region 220-2.

As an example, the transmission region 220 is configured by providing a gap in the first spatial filter 22. The transmission region 220 is a region that transmits light emitted from the light source 20.

The blocking region 221 is a mask that blocks the light emitted from the light source 20. The shape of the blocking region 221 is rectangular as an example in the present embodiment. The shape of the blocking region 221 is not limited to a rectangle and may be any shape as long as it occupies a part of the irradiation region R1. That is, the shape and arrangement of the blocking region 221 in the first spatial filter 22 do not have to be the shape and arrangement to divide the transmission region 220 into two or more regions as shown in FIG. 2. For example, the shape of the blocking region 221 may be a circle of which the diameter is shorter than the diameter of the irradiation region R1 and may be disposed in a center of the first spatial filter 22. As another example, the blocking region 221 may be disposed at an end portion of the irradiation region R1 so that some of the light irradiated to the end portion in the light radiated to the irradiation region R1 is blocked by the blocking region 221. As yet another example, the blocking region 221 may be concentrically disposed at the end portion of the irradiation region R1, and the shape of the transmission region 220 may be a circle structure of which the diameter is shorter than the diameter of the irradiation region R1 and in which the transmission region 220 is disposed on a center portion.

The blocking region 221 is an example of a first region which hinders traveling of the light emitted from the light source 20 toward the observation object 5. Therefore, the first spatial filter 22 has the first region that hinders the traveling of the light emitted from the light source 20 toward the observation object 5.

Due to the first spatial filter 22 having the blocking region 221, a part of a frequency of the light emitted as the structured illumination 4 may be missing. On the other hand, as an area of a region in the irradiation region R1 in which the irradiated light is blocked by the blocking region 221 becomes larger, more abundant information may be obtained as morphological information of the observation object 5 while the signal-to-noise ratio is kept constant. In other words, the region in the irradiation region R1 in which the radiated light is blocked by the blocking region 221 is a region in which the irradiation region R1 and the blocking region 221 overlap each other.

However, when the area of the region in which the irradiation region R1 and the blocking region 221 overlap is too large, the light emitted as the structured illumination 4 may also be blocked. On the other hand, when the area of the region in which the irradiation region R1 and the blocking region 221 overlap is too small, an amount of light scattered by the observation object 5 may not be sufficient for the dark field observation, and the morphological information of the observation object 5 may not be acquired with sufficient accuracy. For these reasons, the area of the region in which the irradiation region R1 and the blocking region 221 overlap is determined in consideration of a structure of the observation object, a structure of the structured illumination light, and the like, and the ratio of the blocking region to the irradiation region R1 is preferably in a range of 5% to 70%.

Returning to FIG. 1, the description of the configuration of the flow cytometer 1 will be continued.

The first objective lens 23 forms an image of light modulated by the spatial optical modulation device 21. The first objective lens 23 forms an image of the light modulated by the spatial optical modulation device 21 at the image position 25 of the flow path. The light imaged by the first objective lens 23 is irradiated to the observation object 5 flowing through the flow path as the structured illumination 4. The first objective lens 23 is an example of a first optical element that forms an image of the light modulated by the spatial optical modulation device 21 in the flow path.

Subsequently, a configuration of the optical detection system 3 will be described. The optical detection system 3 is an optical system which detects light modulated by the observation object 5 flowing in the flow path. The optical detection system 3 includes a second objective lens 30, a second spatial filter 31, an imaging lens 32, and a first light detector 33. In the optical detection system 3, an optical path of the scattered light is referred to as a second optical path 34. In the flow cytometer 1, the forward scattered light which is a light modulated by the object 5 is detected by the first light detector 33.

The second spatial filter 31 has a blocking region which blocks light transmitted through the observation object 5 and a transmission region which transmits light modulated by the observation object 5. The light transmitted through the observation object 5 is direct light in which light emitted from the light source 20 is transmitted through the observation object 5. That is, the second spatial filter 31 blocks the direct light transmitted through the observation object 5. On the other hand, the light modulated by the observation object 5 is scattered light in which the light emitted from the light source 20 is scattered by the observation object 5. That is, the second spatial filter 31 transmits the scattered light scattered by the observation object 5.

The second spatial filter 31 is disposed in the second optical path 34.

The position at which the second spatial filter 31 is disposed and the position at which the first spatial filter 22 is disposed are in a substantially optically conjugate relationship. Here, the fact that the disposed positions are in a substantially optically conjugate relationship means that the first spatial filter 22 and the second spatial filter 31 are disposed at positions which are substantially optically conjugate to each other. Further, in the present embodiment, the first spatial filter 22 and the second spatial filter 31 are disposed substantially parallel to each other.

Figure 3:
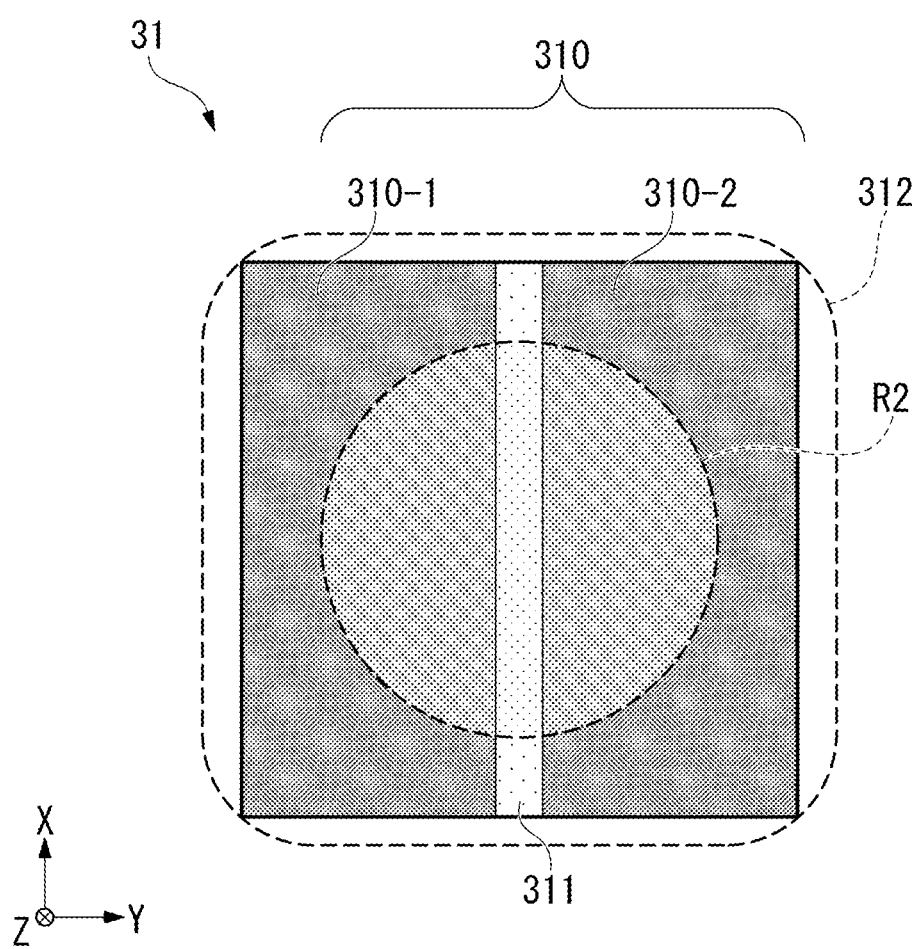
FIG. 3 is a diagram showing an example of a configuration of a second spatial filter included in the flow cytometer according to the first embodiment of the present invention.

Here, with reference to FIG. 3, a configuration of the second spatial filter 31 will be described. FIG. 3 is a diagram showing an example of the configuration of the second spatial filter 31 according to the present embodiment. The shape of the second spatial filter 31 is, for example, a quadrangle and a plate-like shape. FIG. 3 shows a plane 312 when the plate-like second spatial filter 31 is seen from the light source 20 side in the z-axis direction. A surface of the second spatial filter 31 on the light source 20 side is located on the plane 312. An irradiation region R2 indicates a region in which the light radiated to the observation object 5 as the structured illumination 4 is irradiated on the plane 312 through the second objective lens 30 when the first spatial filter 22 is not provided in the flow cytometer 1.

The surface of the second spatial filter 31 located on the plane 312 is divided into a blocking region 310 and a transmission region 311. In FIG. 3, the blocking region 310 of the second spatial filter 31 is separated by the transmission region 311 and consists of two unconnected regions, namely a blocking region 310-1 and a blocking region 310-2.

The blocking region 310 is a mask which blocks the light transmitted through the observation object 5. The light transmitted through the observation object 5 is direct light transmitted through the transmission region 220 included in the first spatial filter 22.

As an example, the transmission region 311 is configured by providing a gap in the second spatial filter 31. A region in which the transmission region 311 and the irradiation region R2 overlap on the plane 312 is substantially the same as a region where an image of the region in which the blocking region 221 and the irradiation region R1 overlap in the first spatial filter is formed on the second spatial filter 31 and occupied on the plane 312. Here, as described above, since the shape of the blocking region 221 is rectangular in the present embodiment, the shape of the transmission region 311 is also rectangular. The transmission region 311 is a region through which the scattered light scattered by the observation object 5 is transmitted.

The region in which the irradiation region R2 and the transmission region 311 overlap on the plane 312 of the second spatial filter 31 and the region in which the irradiation region R1 and the blocking region 221 overlap on the plane 222 of the first spatial filter 22 are in an image formation relationship with each other.

The shape and arrangement of the region in which the irradiation region R2 and the transmission region 311 overlap may be a shape and arrangement wherein the region is included in the image of the region formed on the plane 312 in which the irradiation region R1 and the blocking region 221 overlap.

The transmission region 311 is an example of a second region through which light modulated by the observation object 5 is transmitted. As described above, when the first spatial filter 22 is not provided in the flow cytometer 1, the region in which the irradiation region R2 in which the light irradiated to the observation object 5 as the structured illumination 4 is irradiated on the plane 312 through the second objective lens 30 and the transmission region 311 overlap each other is substantially the same as or included in a region where an image of a region in which the region irradiated with the light emitted from the light source 20 and the first region overlap on the first spatial filter 22 is formed on the second spatial filter 31 is occupied in the second spatial filter 31.

As described above, the position at which the second spatial filter 31 is disposed and the position at which the first spatial filter 22 is disposed are in the substantially optically conjugate relationship. Therefore, regarding the positional relationship between the blocking region 221 included in the first spatial filter 22 and the transmission region 311 included the second spatial filter 31, the position of the blocking region 221 and the position of the transmission region 311 are in a substantially optically conjugate relationship.

In the present embodiment, as an example, the case in which the transmission region 220 included in the first spatial filter 22 and the transmission region 311 included in the second spatial filter 31 are formed by a gap has been described, but the present invention is not limited thereto. The transmission region 220 and the transmission region 311 may be made of a substance having a transmittance of a predetermined value or more.

Returning to FIG. 1, the description of the configuration of the flow cytometer 1 will be continued.

The second objective lens 30 converts the light modulated by the observation object 5 into parallel light. Here, the second optical path 34 is an optical path for scattered light, which is an optical path between the first light detector 33 and the image position 25. As described above, the position at which the second spatial filter 31 is disposed and the position at which the first spatial filter 22 is disposed are in a substantially optically conjugate relationship. The second objective lens 30 may be disposed at any position between the image position 25 in which the structured illumination 4 is imaged in the flow path and the second spatial filter 31 in the second optical path 34 as long as the position at which the second objective lens 30 is disposed does not hinder the substantially optically conjugate relationship between the first spatial filter 22 and the second spatial filter 31.

The imaging lens 32 is disposed at a position between the second spatial filter 31 and the first light detector 33 in the second optical path 34. In the present embodiment, the imaging lens 32 is disposed at a position at which the modulated light by the observation object 5 that has passed through the second objective lens 30 is imaged by the imaging lens 32 on the detection surface of the first light detector 33.

The first light detector 33 detects the scattered light imaged by the imaging lens 32. Here, the scattered light imaged by the imaging lens 32 is the forward scattered light generated by the observation object 5 and is light in which the structured illumination imaged in the flow path by the first objective lens 23 is modulated by the observation object 5 flowing in the flow path, then parallelized by the second objective lens 30 and transmitted through the second spatial filter 31. The first light detector 33 is an example of the first light detector that detects light imaged by an optical element and modulated by the observation object 5 flowing in a flow path. The first light detector 33 has, for example, an optical sensor such as a photomultiplier tube (PMT), a line-type PMT element, a photodiode, an avalanche photo-diode (APD), or a semiconductor optical sensor.

In the present embodiment, although the example in which the scattered light detected by the first light detector 33 is imaged on a detection surface of the first light detector 33 via the second objective lens 30 and the imaging lens 32 has been described, the present invention is not limited thereto. Preferably, the scattered light detected by the first light detector 33 is imaged on the detection surface of the first light detector 33, but may not be imaged on the detection surface of the first light detector 33 as long as a predetermined amount of light or more is collected on the detection surface of the first light detector 33. Similarly in other embodiments, the scattered light detected by the light detector may not be imaged on the detection surface as long as a predetermined amount of light or more is collected on the detection surface of the light detector.

The first light detector 33 converts the detected scattered light into an electric signal pulse and outputs the electric signal pulses to a data acquisition (DAQ) device (not shown) or the like. The DAQ device converts the electrical signal pulse into electronic data on a pulse-by-pulse basis. The DAQ device outputs the electronic data to an analysis device (not shown) or the like. The electronic data is analyzed by the analysis device, and the morphological information of the observation object 5 is acquired.

As described above, the flow cytometer 1 according to the present embodiment includes the optical illumination system 2, the flow path through which the observation object 5 can flow together with a fluid, and the optical detection system 3.

The optical illumination system 2 includes the light source 20, the spatial optical modulation device 21, and the first optical element (the first objective lens 23 in the present embodiment). The spatial optical modulation device 21 modulates light emitted from the light source 20. The first optical element (the first objective lens 23 in the present embodiment) forms an image of light modulated by the spatial optical modulation device 21 in the flow path.

The optical detection system 3 includes the first light detector 33 that detects the light imaged by the first optical element (the first objective lens 23 in the present embodiment) and modulated by the observation object 5 flowing in the flow path.

The optical illumination system 2 further includes the first spatial filter 22. The first spatial filter 22 is disposed in the first optical path 24 between the light source 20 and the image position 25 in the flow path in which an image is formed by the first optical element (the first objective lens 23 in the present embodiment). The first spatial filter 22 has the first region (the blocking region 221 in the present embodiment) which hinders the traveling of the light emitted from the light source 20 toward the observation object 5.

The optical detection system 3 further includes the second spatial filter 31. The second spatial filter 31 is disposed in the second optical path 34 between the first light detector 33 and the image position 25 in the flow path. The second spatial filter 31 has the second region (the transmission region 311 in the present embodiment) that transmits the light modulated by the observation object 5 (the forward scattered light in the present embodiment).

The position of the first region (the blocking region 221 in the present embodiment) and the position of the second region (the transmission region 311 in the present embodiment) are in a substantially optically conjugate relationship.

With such a configuration, in the flow cytometer 1 according to the present embodiment, in a flow cytometry using the structured illumination light, due to a simple configuration in which the first spatial filter 22 and the second spatial filter 31 are provided on the optical path, the modulated light by the observation object can be detected by a simple mechanism as compared with a conventional flow cytometer. Here, the conventional flow cytometer is, for example, a flow cytometer that evaluates characteristics of cells by the total amount of fluorescence brightness or the total amount of scattered light using line-shaped illumination light. As described above, the modulated light by the observation object includes scattered light and diffracted light.

Further, in the flow cytometer 1 according to the present embodiment, since it is possible to detect the scattered light from the observation object 5 which is transmitted through the second region (the transmission region 311 in the present embodiment) disposed at a position that has a substantially optically conjugate relationship with the position of the first region (the blocking region 221 in the present embodiment), scattered light which realizes a higher signal-to-noise ratio than that in a conventional case can be detected. The signal-to-noise ratio is a ratio of the scattered light to light other than the scattered light in the light detected by the first light detector 33. The light other than the scattered light is, for example, direct light.

In the flow cytometer 1 according to the present embodiment, it is possible to analyze the scattered light detected at a signal-to-noise ratio higher than that in the conventional case. In the flow cytometer 1 according to the present embodiment, since the illumination light is modulated by a modulation device and the structured illumination can be irradiated to an observation object to extract the morphological information with higher resolution based on the scattered light, detailed morphological information about the observation object 5 can be obtained without labeling with a fluorescent substance (label-free), and the observation object 5 can be measured and classified in a non-invasive manner.

Modified Example of First Embodiment

Figure 4:
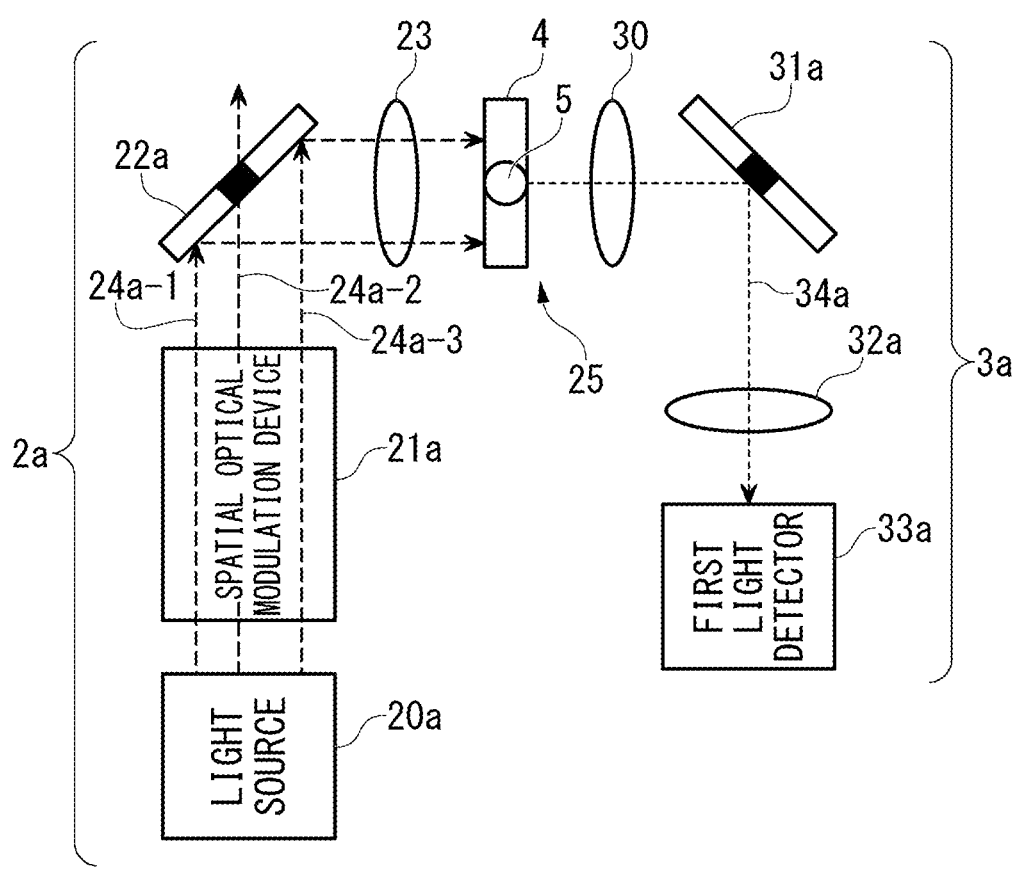
FIG. 4 is a diagram showing an example of a configuration of a flow cytometer according to a modified example of the first embodiment of the present invention.

Here, a modified example of the present embodiment will be described. FIG. 4 is a diagram showing an example of a flow cytometer 1a according to the modified example of the present embodiment. The flow cytometer 1a includes a flow path (not shown), an optical illumination system 2a, and an optical detection system 3a.

The same configuration and operation as those in the first embodiment described above are designated by the same reference numerals, and a description thereof will be omitted.

The optical illumination system 2a includes a light source 20a, a spatial optical modulation device 21a, a first spatial filter 22a, and a first objective lens 23. The optical path of the illumination light of the optical illumination system 2a is referred to as a first optical path 24a. In FIG. 4, as an example of the first optical path 24a, a first optical path 24a-1, a first optical path 24a-2, and a first optical path 24a-3 are shown. The first optical path 24a is parallel to the x-axis in a section from the light source 20a to the first spatial filter 22a. In the first optical path 24a, the first optical path 24a-1 and the first optical path 24a-3 bend at a substantially right angle at the position of the first spatial filter 22a due to the illumination light being reflected by the first spatial filter 22a. As a result, the first optical path 24a-1 and the first optical path 24a-3 are parallel to the z-axis in a section from the first spatial filter 22a to the observation object 5. The light source 20a, the spatial optical modulation device 21a, the first spatial filter 22a, and the first objective lens 23 are provided on the first optical path 24a in this order in a direction in which the illumination light is directed toward the observation object 5 flowing through the flow path.

The configurations of the light source 20a and the spatial optical modulation device 21a are the same as the configurations of the light source 20 and the spatial optical modulation device 21 of the first embodiment, except that a direction of the first optical path 24a provided with them is parallel to the x-axis.

The first spatial filter 22a has a reflection region which reflects the light emitted from the light source 20a and a transmission region which transmits the light emitted from the light source 20a. As an example, the first spatial filter 22a is disposed to be inclined only at a predetermined angle from a direction substantially perpendicular to the first optical path 24a (that is, the x-axis direction). Here, the predetermined angle is, for example, 45 degrees clockwise when seen in the −y direction.

Figure 5:
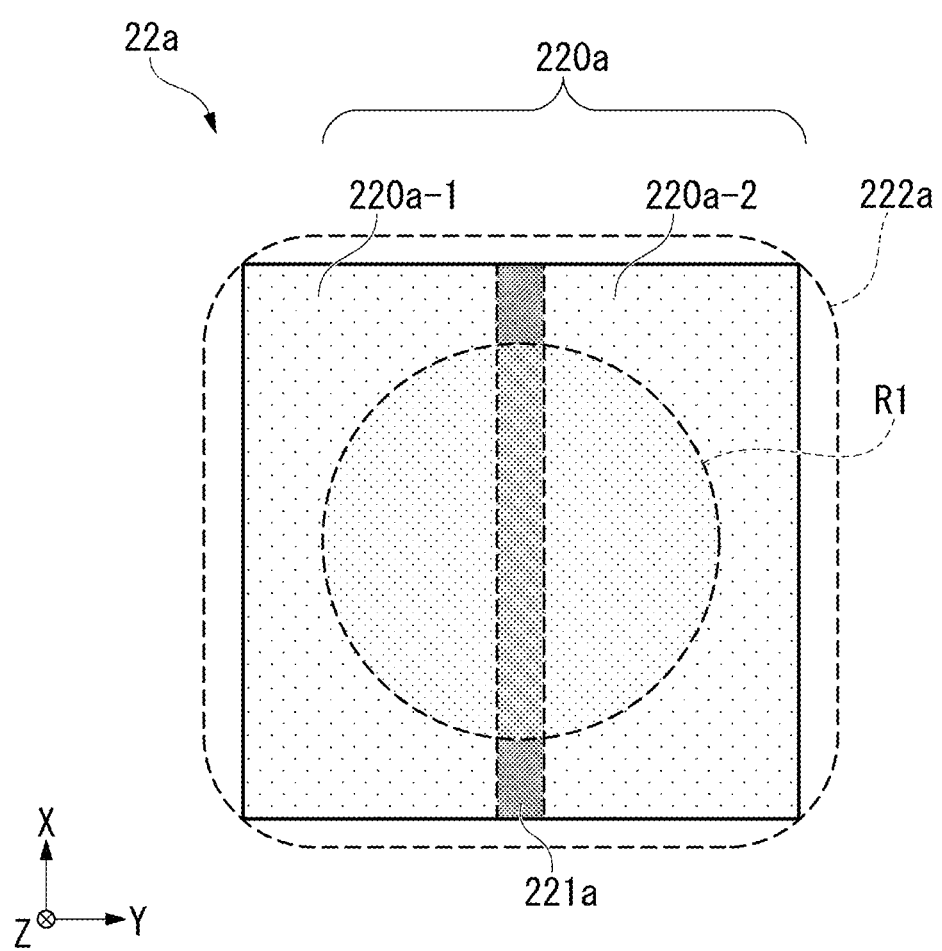
FIG. 5 is a diagram showing an example of a configuration of a first spatial filter included in the flow cytometer according to the modified example of the first embodiment of the present invention.

Here, with reference to FIG. 5, the configuration of the first spatial filter 22a will be described. FIG. 5 is a diagram showing an example of the configuration of the first spatial filter 22a according to the modified example. In FIG. 5, a plane 222a which is a plane of the plate-like first spatial filter 22a on the light source 20a side, that is, a plane when the first spatial filter 22a is seen from the light source 20a side in the x-axis direction in FIG. 4 is shown. A surface of the first spatial filter 22a on the light source 20 side is located on the plane 222a.

The surface of the first spatial filter 22a located on the plane 222a is divided into a reflection region 220a and a transmission region 221a. In FIG. 5, the reflection region 220a of the first spatial filter 22a is separated by the transmission region 221a and consists of two unconnected regions, namely a reflection region 220a-1 and a reflection region 220a-2. The reflection region 220a is a mirror which reflects the illumination light from the light source 20a. The transmission region 221a transmits the illumination light from the light source 20a.

Here, in the light emitted from the light source 20a, the light transmitted through the transmission region 221a is not irradiated to the observation object 5. In this sense, the transmission region 221a is an example of a first region which hinders the traveling of the light emitted from the light source 20a toward the observation object 5.

Returning to FIG. 4, the description of the configuration of the flow cytometer Ta will be continued.

The optical detection system 3a includes a second objective lens 30, a second spatial filter 31a, an imaging lens 32a, and a first light detector 33a. In the optical detection system 3a, the optical path of the forward scattered light is referred to as a second optical path 34a. The second optical path 34a is parallel to the z-axis in a section from the observation object 5 to the second spatial filter 31a. The second optical path 34a bends at a substantially right angle at the position of the second spatial filter 31a due to the forward scattered light being reflected by the second spatial filter 31a. As a result, the second optical path 34a is parallel to the x-axis in a section from the second spatial filter 31a to the first light detector 33a. The second objective lens 30, the second spatial filter 31a, the imaging lens 32a, and the first light detector 33a are provided in this order on the second optical path 34a in a direction in which the forward scattered light is directed from the observation object 5 flowing through the flow path to the first light detector 33a.

The second spatial filter 31a has a reflection region which reflects the light modulated by the observation object 5 and a blocking region which blocks the light that has passed through the observation object 5. In the modified example, the light modulated by the observation object 5 is the forward scattered light as described above. The second spatial filter 31a is disposed to be inclined only at a predetermined angle from a direction substantially perpendicular to the second optical path 34a (that is, the z-axis direction). Here, the predetermined angle is, for example, 45 degrees counterclockwise when seen in the −y direction. Further, the position at which the second spatial filter 31a is disposed and the position at which the first spatial filter 22a is disposed are in a substantially optically conjugate relationship.

Figure 6:
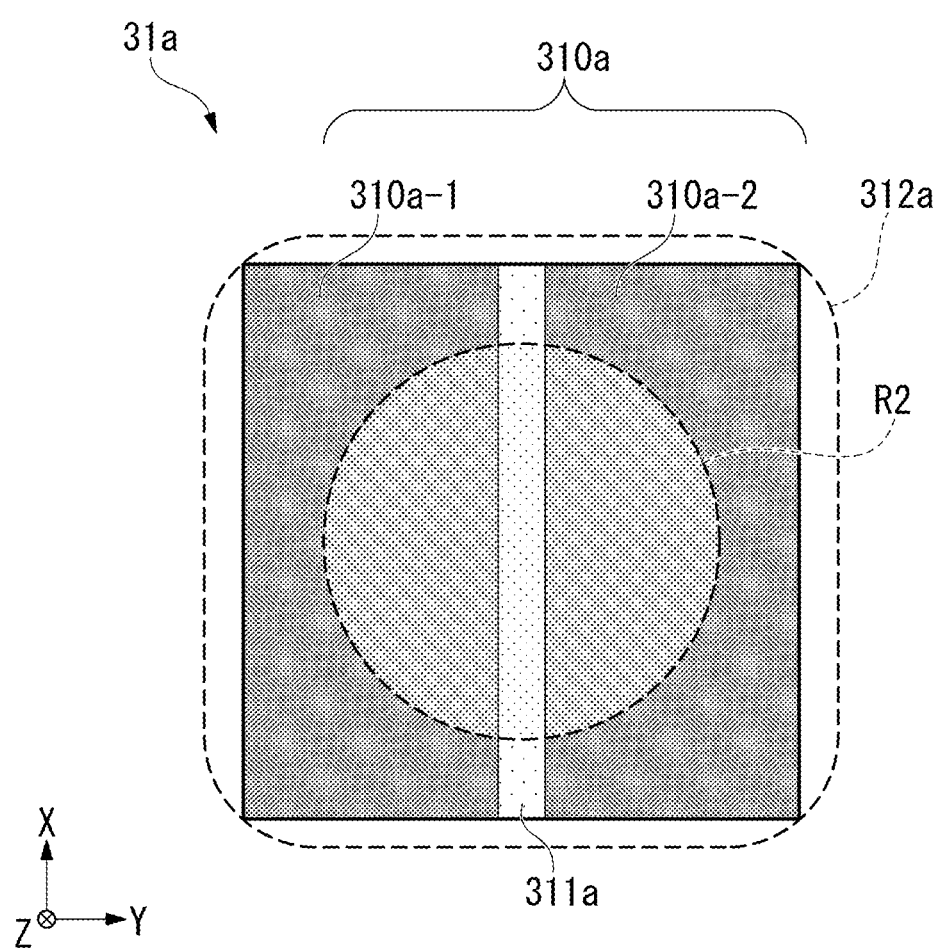
FIG. 6 is a diagram showing an example of a configuration of a second spatial filter included in the flow cytometer according to the modified example of the first embodiment of the present invention.

Here, the configuration of the second spatial filter 31a will be described with reference to FIG. 6. FIG. 6 is a diagram showing an example of the configuration of the second spatial filter 31a according to the modified example. In FIG. 6, the surface of the plate-like second spatial filter 31a on the observation object side, that is, a plane 312a when the second spatial filter 31a is seen from the side of the observation object 5 in the z-axis direction in FIG. 4 is shown. The surface of the second spatial filter 31a on the observation object 5 side (the light source 20 side) is located on the plane 312a.

The surface of the second spatial filter 31a located on the plane 312a is divided into a blocking region 310a and a reflection region 311a. In FIG. 6, the blocking region 310a of the second spatial filter 31a is separated by the reflection region 311a and consists of two unconnected regions, namely a blocking region 310a-1 and a blocking region 310a-2. The reflection region 311a is, for example, a mirror.

Returning to FIG. 4, a description of the configuration of the flow cytometer 1a will be continued.

The configurations of the imaging lens 32a and the first light detector 33a are the same as the configurations of the imaging lens 32 and the first light detector 33 shown in FIG. 1, respectively, except that the direction of the second optical path 34a provided with them is parallel to the x-axis.

In the flow cytometer 1a, the optical detection system 3 shown in FIG. 1 may be provided instead of the optical detection system 3a. Further, in the flow cytometer 1 of the first embodiment, the optical detection system 3a shown in FIG. 4 may be provided instead of the optical detection system 3.

Second Embodiment

Hereinafter, a second embodiment of the present invention will be described in detail with reference to the drawings.

In the first embodiment described above, the case in which the flow cytometer detects the forward scattered light by the observation object has been described. In the present embodiment, a case in which the flow cytometer detects backward scattered light by the observation object will be described.

Figure 7:
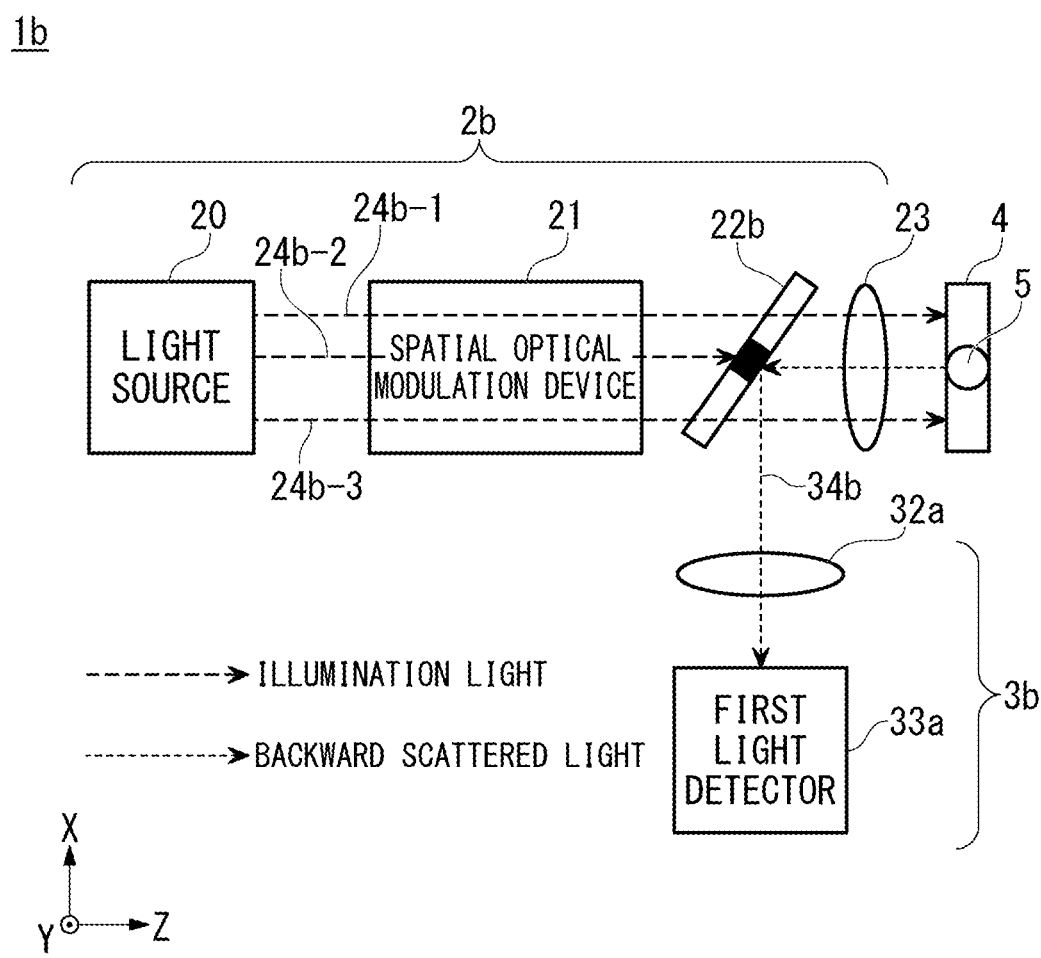
FIG. 7 is a diagram showing an example of a configuration of a flow cytometer according to a second embodiment of the present invention.

FIG. 7 is a diagram showing an example of a configuration of a flow cytometer 1b according to the present embodiment. The flow cytometer 1b includes a flow path (not shown), an optical illumination system 2b, and an optical detection system 3b.

The same configuration and operation as those of the first embodiment described above are designated by the same reference numerals, and a description thereof will be omitted.

The flow cytometer according to the present embodiment is referred to as the flow cytometer 1b.

The flow cytometer 1b detects backward scattered light as light modulated by the observation object. In the flow cytometer 1b, the optical detection system 3b detects the backward scattered light in which the structured illumination 4 is scattered by the observation object 5. The backward scattered light is light scattered in a negative direction of the z-axis in the scattered lights from the observation object 5.

The optical illumination system 2b includes the light source 20, the spatial optical modulation device 21, the first spatial filter 22b, and the first objective lens 23. The optical path of the illumination light in the optical illumination system 2b is referred to as a first optical path 24b. In FIG. 7, as an example of the first optical path 24b, a first optical path 24b-1, a first optical path 24b-2, and a first optical path 24b-3 are shown.

The first spatial filter 22b has a blocking region which blocks the light emitted from the light source 20 and a transmission region which transmits the light emitted from the light source 20. Further, to the back side of the blocking region, the first spatial filter 22b has a reflection region which reflects the backward scattered light from the observation object 5. The first optical path 24b-1 and the first optical path 24b-3 are optical paths of light, which passes through the transmission region of the first spatial filter 22b, in the illumination light. The first optical path 24b-2 is an optical path taken by light, which is blocked by the blocking region of the first spatial filter 22b, in the illumination light.

As an example, the first spatial filter 22b is disposed to be inclined only at a predetermined angle from a direction substantially perpendicular to the first optical path 24b (that is, the z-axis direction). Here, the predetermined angle is, for example, 45 degrees clockwise when seen in the −y direction.

Figure 8:
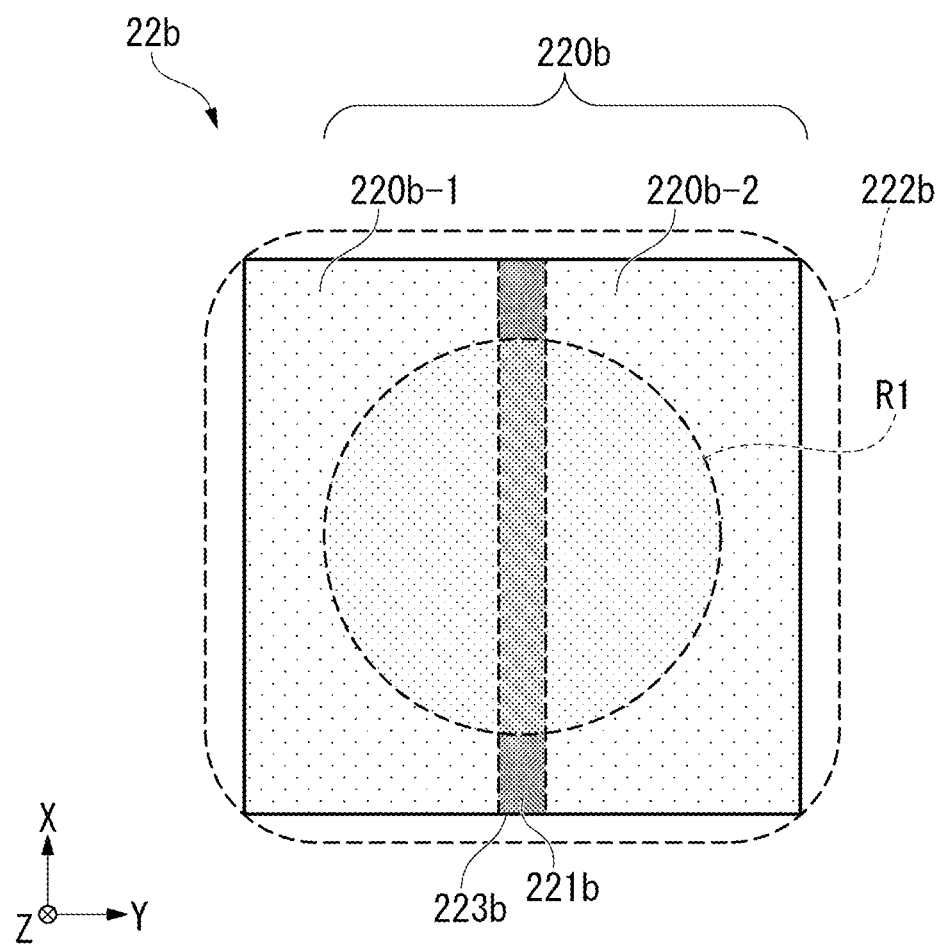
FIG. 8 is a diagram showing an example of a configuration of a first spatial filter included in the flow cytometer according to the second embodiment of the present invention.

Here, with reference to FIG. 8, the configuration of the first spatial filter 22b will be described. FIG. 8 is a diagram showing an example of the configuration of the first spatial filter 22b according to the present embodiment. In FIG. 8, a plane 222b which is a plane of the plate-like first spatial filter 22b on the light source 20 side, that is, a plane when the first spatial filter is seen from the light source 20 side in the z-axis direction in FIG. 7 is shown. A surface of the first spatial filter 22b on the light source 20 side is located on the plane 222b.

The surface of the first spatial filter 22b located on the plane 222b is divided into a transmission region 220b and a blocking region 221b. In FIG. 8, in the first spatial filter 22b, the transmission region 220b is separated by the blocking region 221b and consists of two unconnected regions, namely a transmission region 220b-1 and a transmission region 220b-2.

On the back surface of the first spatial filter 22b (the surface of the first spatial filter 22b on the image position 25 side), the first spatial filter 22b has a reflection region 223b in a region opposing to the blocking region 221b. The reflection region 223b is a mirror which reflects the backward scattered light from the observation object 5. The mirror is an example of a member which reflects the scattered light emitted from the observation object 5. That is, the whole or a part of the first region which hinders the traveling of the light emitted from the light source 20 toward the observation object 5 is configured of a member which reflects scattered light emitted from the light source 20 and scattered backward by the observation object 5 on the side of a surface facing the image position 25 (the side which faces the side opposite to the light source 20) among surfaces constituting the first spatial filter 22b.

As described above, the first spatial filter 22b has the blocking region 221b which blocks the light emitted from the light source 20 on the surface on the light source 20 side and has the reflection region 223b which reflects the scattered light of the light emitted from the observation object 5 on the surface opposite to the light source 20.

Returning to FIG. 7, the description of the configuration of the flow cytometer 1b will be continued.

The optical detection system 3b includes an imaging lens 32a and a first light detector 33a. The configurations of the imaging lens 32a and the first light detector 33a are the same as the configurations of the imaging lens 32a and the first light detector 33a shown in FIG. 4, respectively. As an example in FIG. 7, the second spatial filter is also served by the first spatial filter 22b. The first spatial filter 22b has a first region (the blocking region 221b in the present embodiment) which hinders irradiation of the light source light to the observation object 5 on the surface on the light source 20 side and has a structure having a member (the reflection region 223b in the present embodiment) which reflects backward scattered light from the observation object 5 on the surface opposite to the light source 20, and the first region (the blocking region 221b in the present embodiment) and the second region (the reflection region 223b in the present embodiment) are disposed at positions which have a substantially optically conjugate relationship.

In the optical detection system 3b, an optical path of the backward scattered light is referred to as a second optical path 34b. The second optical path 34b is parallel to the z-axis in a section from the observation object 5 to the first spatial filter 22b. The second optical path 34b bends at a substantially right angle at the position of the first spatial filter 22b due to the backward scattered light being reflected by the first spatial filter 22b (on the side of the first spatial filter which faces the image position 25). As a result, the second optical path 34b becomes parallel to the x-axis in a section from the first spatial filter 22b to the first light detector 33a.

In the present embodiment, as an example, the case in which the second spatial filter is also served by the first spatial filter 22b has been described, but the present invention is not limited thereto. The second spatial filter may not be served by the first spatial filter 22b. In this case, a spatial filter different from the first spatial filter 22b is disposed as the second spatial filter at a position in the second optical path 34b which is different from the position at which the first spatial filter 22b is disposed and also a position at which the position of the first region and the position of the second region are in a substantially optically conjugate relationship.

Modified Example of Second Embodiment

Figure 9:
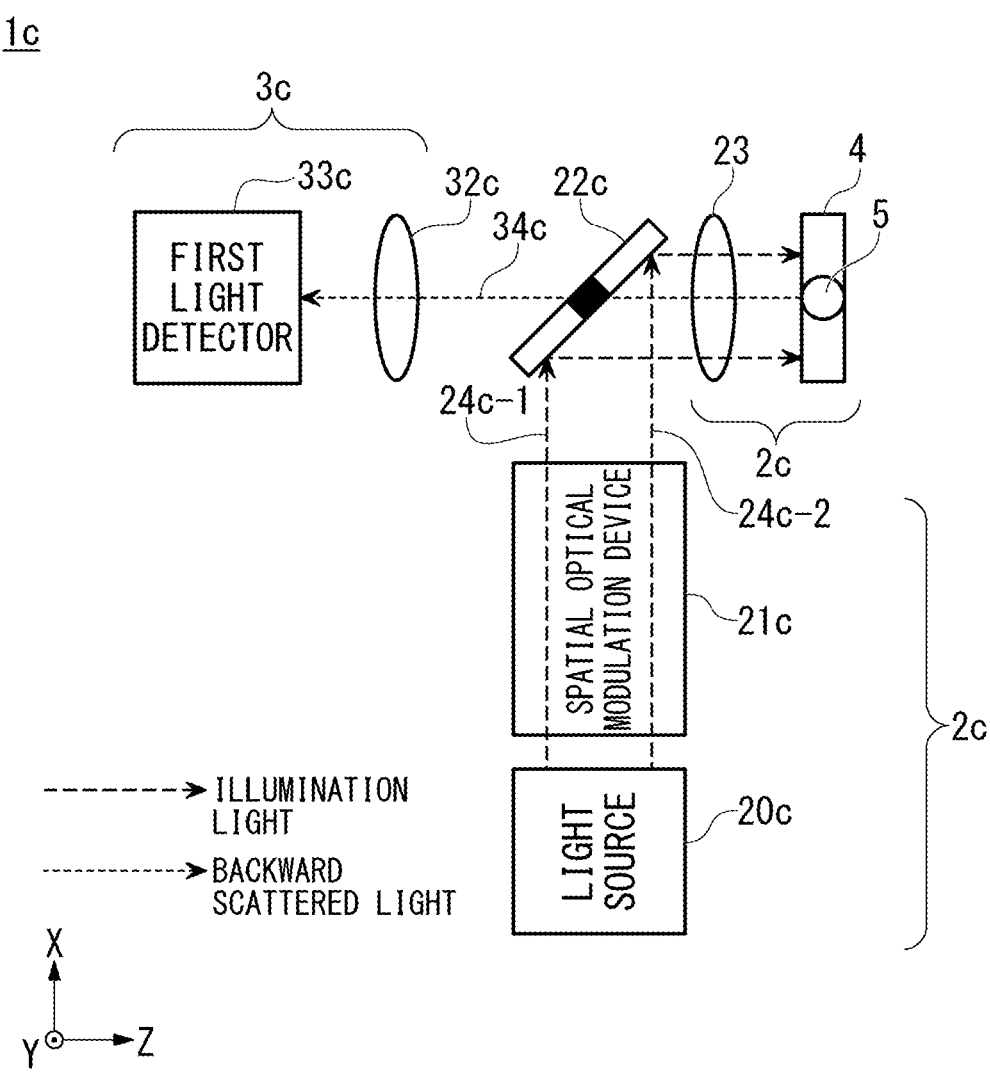
FIG. 9 is a diagram showing an example of a configuration of a flow cytometer according to a modified example of the second embodiment of the present invention.

Here, a modified example of the present embodiment will be described. FIG. 9 is a diagram showing an example of a flow cytometer 1c according to a modified example of the present embodiment. The flow cytometer 1c includes a flow path (not shown), an optical illumination system 2c, and an optical detection system 3c.

The same configurations and operations as those in the second embodiment described above are designated by the same reference numerals, and a description thereof will be omitted.

The optical illumination system 2c includes a light source 20c, a spatial optical modulation device 21c, a first spatial filter 22c, and a first objective lens 23. An optical path of the illumination light of the optical illumination system 2c is referred to as a first optical path 24c. In FIG. 9, as an example of the first optical path 24c, a first optical path 24c-1 and a first optical path 24c-2 are shown. The first optical path 24c is parallel to the x-axis in a section from the light source 20c to the first spatial filter. The first optical path 24c-1 and the first optical path 24c-2 bend at a substantially right angle at the position of the first spatial filter 22c due to the illumination light being reflected by the first spatial filter 22c. As a result, the first optical path 24c-1 and the first optical path 24c-2 are parallel to the z-axis in a section from the first spatial filter 22c to the observation object 5. The light source 20c, the spatial optical modulation device 21c, the first spatial filter 22c, and the first objective lens 23 are provided on the first optical path 24c in this order in a direction in which the illumination light is directed to the observation object 5 flowing through the flow path.

The configurations of the light source 20c and the spatial optical modulation device 21c are the same as the configurations of the light source 20 and the spatial optical modulation device 21 of the first embodiment, respectively, except for the fact that a direction of the first optical path 24c provided with them is parallel to the x-axis. The configuration of the first spatial filter 22c is the same as the configuration of the first spatial filter 22a shown in FIG. 4.

The optical detection system 3c includes an imaging lens 32c and a first light detector 33c. In the optical detection system 3c, the optical path of the backward scattered light is referred to as a second optical path 34c. The second optical path 34c is parallel to the z-axis. The second optical path 34c is an optical path taken by the light which passes through the first spatial filter 22c in the backward scattered light. The imaging lens 32c and the first light detector 33c are provided in this order on the second optical path 34c in a direction in which the scattered light is directed from the observation object 5 flowing through the flow path to the first light detector 33c.

The configurations of the imaging lens 32c and the first light detector 33c are the same as the configurations of the imaging lens 32 and the first light detector 33 shown in FIG. 1, respectively, except for the fact that the direction of the second optical path 34c and the direction of the z-axis shown in the drawing are opposite to each other.

In FIG. 9, as a modified example of the present embodiment, the example in which the second spatial filter is also served by the first spatial filter 22c is described, but the present invention is not limited thereto. Similar to the present embodiment, when the first spatial filter 22c does not serve as the second spatial filter, a spatial filter different from the first spatial filter 22c may be disposed as the second spatial filter at a position in the second optical path 34c which is different from the position at which the first spatial filter 22c is disposed and also a position at which the position of the first region and the position of the second region are in a substantially optically conjugate relationship.

Third Embodiment

Hereinafter, a third embodiment of the present invention will be described in detail with reference to the drawings.

In the first embodiment and the second embodiment, the case in which the flow cytometer detects the forward scattered light or the backward scattered light by the observation object has been described. In the present embodiment, a case in which the flow cytometer simultaneously detects the forward scattered light and the backward scattered light by the observation object will be described.

The flow cytometer according to the present embodiment is referred to as a flow cytometer 1d.

Figure 10:
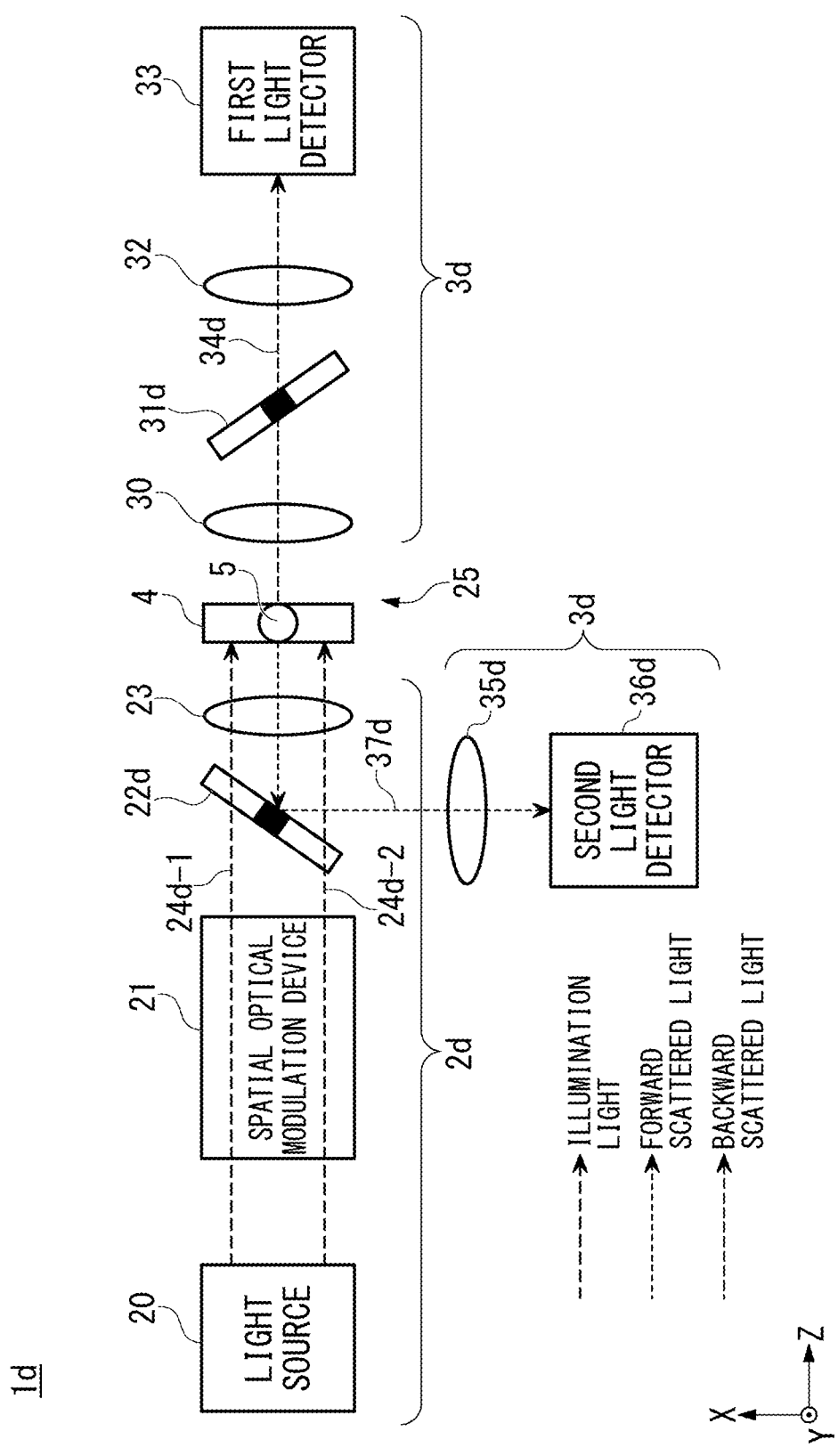
FIG. 10 is a diagram showing an example of a configuration of a flow cytometer according to a third embodiment of the present invention.

FIG. 10 is a diagram showing an example of a configuration of the flow cytometer 1d according to the present embodiment.

The flow cytometer 1d includes a flow path (not shown), an optical illumination system 2d, and an optical detection system 3d.

The same configurations and operations as those of the first embodiment described above are designated by the same reference numerals, and a description thereof will be omitted.

In the flow cytometer 1d, the forward scattered light and the backward scattered light in which the structured illumination 4 is scattered by the observation object 5 are detected by the optical detection system 3d. FIG. 10 shows, as an example, a case in which the second spatial filter is also used by the first spatial filter 22d in detecting backward scattered light, but the present invention is not limited thereto. Similar to the previous example, when the first spatial filter 22d does not serve as the second spatial filter in detecting the backward scattered light, a spatial filter different from the first spatial filter 22d is disposed as the second spatial filter at a position in the third optical path 37d which is different from the position at which the first spatial filter 22d is disposed and also a position at which the position of the first region and the position of the second region are in a substantially optically conjugate relationship.

The optical illumination system 2d includes a light source 20, a spatial optical modulation device 21, a first spatial filter 22d, and a first objective lens 23. The optical path of the illumination light of the optical illumination system 2d is referred to as a first optical path 24d. In FIG. 10, as an example of the first optical path 24d, a first optical path 24d-1 and a first optical path 24b-2 are shown.

The configuration of the first spatial filter 22d shown in FIG. 10 is the same as the configuration of the first spatial filter 22b shown in FIG. 8. That is, the first spatial filter 22d has a blocking region 221d (corresponding to the blocking region 221b in FIG. 8) which blocks the light emitted from the light source 20 on the surface on the light source 20 side and has a reflection region 223d (corresponding to the reflection region 223b in FIG. 8) which reflects the scattered light of the light emitted from the observation object 5 on the surface opposite to the light source 20. The first optical path 24d-1 and the first optical path 24d-2 are optical paths of light which pass through the transmission region 220d of the first spatial filter 22d in the illumination light.

As an example, the first spatial filter 22d is disposed to be inclined only at a predetermined angle from a direction substantially perpendicular to the first optical path 24d (that is, the z-axis direction). Here, the predetermined angle is, for example, 45 degrees clockwise when seen in the −y direction.

For the detection of the forward scattered light, a second spatial filter 31d is disposed as the second spatial filter. The configuration of the second spatial filter 31d is the same as the configuration of the second spatial filter 31 shown in FIG. 3. That is, the second spatial filter 31d includes a transmission region 311d (corresponding to the transmission region 311 in FIG. 3) which transmits scattered light emitted from the observation object 5 on the surface on the light source 20 side, and a blocking region 310d (corresponding to the blocking region 310 in FIG. 3) which blocks direct light emitted from the light source 20. Since the first spatial filter 22d is disposed to be inclined only at a predetermined angle from a direction substantially perpendicular to the first optical path 24d (that is, a direction substantially perpendicular to the direction of the light emitted from the light source 20), images of points included in the blocking region 221d are located at different locations with respect to the direction of the optical axis. Correspondingly, the second spatial filter 31d is inclined, and images of the region in which the irradiation region R1 and the blocking region 221d overlap on the first spatial filter 22d are formed in different locations of the second spatial filter 31d with respect to the direction of the optical axis. Thus, the region in which the irradiation region R1 and the blocking region 221d overlap on the first spatial filter 22d, and the region in which the irradiation region R2 and the transmission region 311d overlap on the second spatial filter 31d are disposed at positions which have a substantially optically conjugate relationship.

The first objective lens 23 forms an image of the light modulated by the spatial optical modulation device 21 at the image position 25 on the flow path. Further, the first objective lens 23 makes the backward scattered light from the observation object 5 parallel light. Here, the backward scattered light from the observation object 5 is reflected by the reflection region 223d of the first spatial filter 22d, travels in the −x direction, passes through the second imaging lens 35d and is then focused on a detection surface of the second light detector 36d.

Subsequently, the configuration of the optical detection system 3d will be described. The optical detection system 3d includes the second objective lens 30, the second spatial filter 31d, the imaging lens 32, the first light detector 33, the second imaging lens 35d, and the second light detector 36d.

In the optical detection system 3d, the optical path of the forward scattered light is referred to as a second optical path 34d. The second optical path 34d is parallel to the z-axis like the second optical path 34 shown in FIG. 1.

Further, in the optical detection system 3d, the optical path of the backward scattered light is referred to as a third optical path 37d. The third optical path 37d is parallel to the z-axis in a section from the observation object 5 to the first spatial filter 22d. The third optical path 37d bends at a substantially right angle at the position of the first spatial filter 22d due to the backward scattered light being reflected by the first spatial filter 22d. As a result, the third optical path 37d is parallel to the x-axis in a section from the first spatial filter 22d to the second light detector 36d.

The second spatial filter 31d has a blocking region 310d which blocks the direct light transmitted through the observation object 5 and a transmission region 311d which transmits the forward scattered light from the observation object 5. The second spatial filter 31d is disposed to be inclined only at a predetermined angle from a direction substantially perpendicular to the second optical path 34d (that is, the z-axis direction). Here, the predetermined angle is, for example, 45 degrees counterclockwise when seen in the −y direction. The configuration of the second spatial filter 31d is the same as the configuration of the second spatial filter 31 (FIG. 3) except that the second spatial filter 31d is disposed to be inclined only at the predetermined angle from the direction substantially perpendicular to the second optical path 34d.

As described above, the first spatial filter 22d and the second spatial filter 31d are disposed to be inclined only at a predetermined angle from the direction substantially perpendicular to the first optical path 24d (that is, the z-axis direction). The position at which the second spatial filter 31d is disposed is located at a position which has a conjugate relationship with the first spatial filter 22d, and an image of a shadow region (a region of the irradiation region R1 blocked by the blocking region 221) generated by the blocking region 221 of the first spatial filter 22d is substantially the same as a region in which the irradiation region R2 and the transmission region 311d overlap on a plane of the second spatial filter 31d.

The second imaging lens 35d forms an image of the backward scattered light reflected by the first spatial filter 22d. Here, the first spatial filter 22d also serves as the second spatial filter for detection of the backward scattered light. In the present embodiment, the first spatial filter 22d has a first region (the blocking region 221d on the surface on the light source side) and a second region (the reflection region 223d on the surface on the image position 25 side).

The second light detector 36d detects the backward scattered light imaged by the second imaging lens 35d. Here, the backward scattered light imaged by the second imaging lens 35d is light reflected by the reflection region 223d constituted by a member of the first spatial filter 22d which reflects the scattered light emitted from the observation object 5. Therefore, the second light detector 36d detects the scattered light emitted from the observation object 5 by reflecting the scattered light by the reflecting member.

Only the backward scattered light may be detected by the flow cytometer 1d. In that case, the second objective lens 30, the second spatial filter 31d, the imaging lens 32, and the first light detector 33 are omitted from the optical detection system 3d.

As described above, in the flow cytometer 1d according to the present embodiment, the whole or a part of the first region (the blocking region 221d in the present embodiment) is configured of a member (a mirror constituting the reflection region 223d in the present embodiment) which reflects the scattered light, in which the light emitted from the light source 20 is scattered by the observation object 5, on the side facings the image position 25 (the side opposite to the light source 20) among the surfaces constituting the first spatial filter 22d. In the flow cytometer 1d, a second light detector 36d which detects the scattered light reflected by the member (the mirror constituting the reflection region 223d in the present embodiment) which reflects the scattered light, in which the light emitted from the light source 20 is scattered by the observation object 5, is provided as a part of the optical detection system 3d.

With such a configuration, in the flow cytometer 1d according to the present embodiment, the first spatial filter 22d has the first region (the blocking region 221d in the present embodiment) which hinders irradiating of the light source light to the observation object 5 on the surface on the light source 20 side and has a structure having the member (the mirror constituting the reflection region 223d in the present embodiment) which reflects the backward scattered light from the observation object 5 on the surface opposite to the light source 20. Further, in the flow cytometer 1d according to the present embodiment, the first region (the blocking region 221d of the first spatial filter 22d in the present embodiment) which hinders irradiating of the light source light to the observation object 5 is disposed at a position which has a substantially optically conjugate relationship with the second region (the transmission region 311d of the second spatial filter 31d in the present embodiment) which transmits the forward scattered light from the observation object 5. Therefore, the backward scattered light can be detected in addition to the forward scattered light as scattered lights which realize a higher signal-to-noise ratio than in the conventional one. In the flow cytometer 1d according to the present embodiment, the illumination light is modulated by a modulation device, and the structured illumination is irradiated to the observation object and simultaneously acquired as forward and backward scattered lights. Therefore, morphological information with higher resolution on the observation object 5 can be obtained without labeling with a fluorescent substance (label-free), and the observation object 5 can be measured and classified non-invasively.

Modified Example of Third Embodiment

Figure 11:
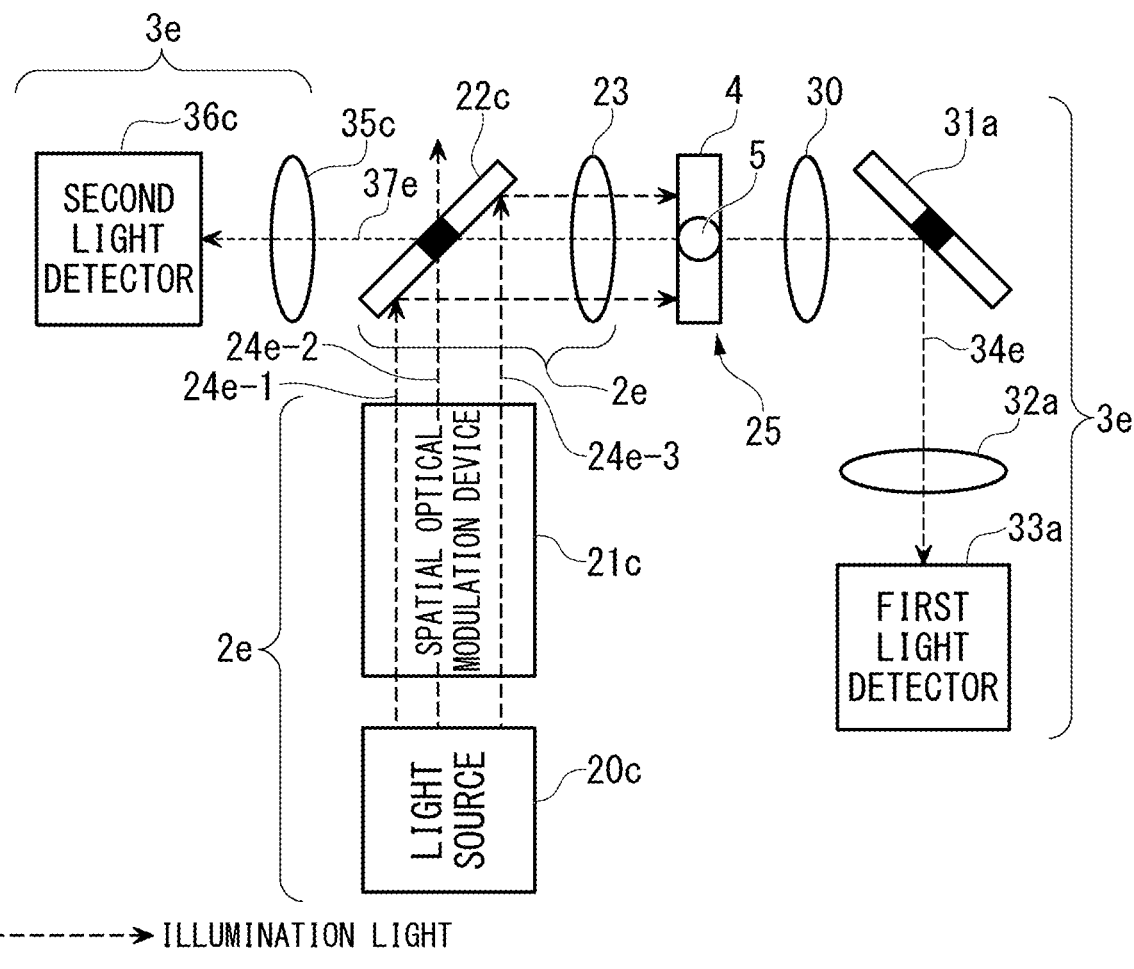
FIG. 11 is a diagram showing an example of a configuration of a flow cytometer according to a modified example of the third embodiment of the present invention.

Here, a modified example of the present embodiment will be described. FIG. 11 is a diagram showing an example of a configuration of a flow cytometer 1e according to the present embodiment. The flow cytometer 1e includes a flow path (not shown), an optical illumination system 2e, and an optical detection system 3e.

The same configurations and operations as those in the above-described embodiments and modified examples thereof are designated by the same reference numerals, and the description thereof will be omitted.

The optical illumination system 2e includes the light source 20c, the spatial optical modulation device 21c, the first spatial filter 22c, and the first objective lens 23. An optical path of the illumination light of the optical illumination system 2e is referred to as a first optical path 24e. In FIG. 11, as an example of the first optical path 24e, a first optical path 24e-1, a first optical path 24e-2, and a first optical path 24e-3 are shown. The first optical path 24e is parallel to the x-axis in a section from the light source 20c to the first spatial filter 22c. The first optical path 24e-1 and the first optical path 24e-3 bend at a substantially right angle at the position of the first spatial filter 22c due to the illumination light being reflected by the first spatial filter 22c. As a result, the first optical path 24e-1 and the first optical path 24e-3 are parallel to the z-axis in a section from the first spatial filter 22c to the observation object 5. On the other hand, in the first optical path 24e-2, the illumination light passes through the first spatial filter 22c. The light source 20c, the spatial optical modulation device 21c, and the first spatial filter 22c are provided in this order on the first optical path 24e in the +x direction.

The first spatial filter 22c has a reflection region which reflects the light emitted from the light source 20c, and a transmission region which transmits the light emitted from the light source 20c and the backward scattered light from the observation object 5. Similar to the first spatial filter 22c (FIG. 9) according to the modified example of the second embodiment, the first spatial filter 22c is disposed to be inclined only at a predetermined angle from a direction substantially perpendicular to the z-axis direction. The configuration of the first spatial filter 22c is the same as the configuration of the first spatial filter 22a shown in FIG. 4 and has a transmission region 221c as the transmission region in a center portion and a reflection region 220c as the reflection region at both end portions.

The modulated illumination light is reflected by the reflection region 220c of the first spatial filter 22c, and a pattern of the structured illumination light is imaged at the image position 25 in the flow path. Further, the first objective lens 23 parallelizes the backward scattered light from the observation object 5 and irradiates the first spatial filter 22c. The backward scattered light irradiated to the first spatial filter 22c passes through the transmission region 221c of the first spatial filter 22b and travels in the −z direction.

Subsequently, the configuration of the optical detection system 3e will be described. The optical detection system 3e includes the second objective lens 30, the second spatial filter 31a, the imaging lens 32a, the first light detector 33a, a second imaging lens 35c, and a second light detector 36c.

In the optical detection system 3e, the optical path of the forward scattered light is referred to as a second optical path 34e. The second optical path 34e is parallel to the z-axis in a section from the observation object 5 to the second spatial filter 31a. The second optical path 34e bends at a substantially right angle at the position of the second spatial filter 31a due to the forward scattered light being reflected by the second spatial filter 31a. As a result, the second optical path 34e is parallel to the x-axis in a section from the second spatial filter 31a to the first light detector 33a.

Further, in the optical detection system 3e, the optical path of the backward scattered light is referred to as a third optical path 37e. The third optical path 37e is parallel to the z-axis in a section from the observation object 5 to the second light detector 36c via the first spatial filter 22c.

The configurations of the second spatial filter 31a, the imaging lens 32a, and the first light detector 33a are the same as the configurations of the second spatial filter 31a, the imaging lens 32a, and the first light detector 33a shown in FIG. 4, respectively.

The configurations of the second imaging lens 35c and the second light detector 36c are the same as the configurations of the imaging lens 32c and the first light detector 33c shown in FIG. 9, respectively.

In the flow cytometer 1e, the configuration for detecting the forward scattered light in the optical detection system 3e may be replaced by the configuration for detecting the forward scattered light in the optical detection system 3d shown in FIG. 10. That is, the second spatial filter 31a, the imaging lens 32a, and the first light detector 33a in the optical detection system 3e may be replaced by the second spatial filter 31d, the imaging lens 32, and the first light detector 33 in the optical detection systems 3d shown in FIG. 10.

Further, in the flow cytometer 1d of the third embodiment, the configuration for detecting the forward scattered light in the optical detection system 3d may be replaced by the configuration for detecting the forward scattered light in the optical detection system 3e shown in FIG. 11. That is, the second spatial filter 31d, the imaging lens 32, and the first light detector 33 in the optical detection system 3d may be replaced by the second spatial filter 31a, the imaging lens 32a, and the first light detector 33a in the optical detection systems 3e shown in FIG. 11.

Further, in FIG. 11, as the modified example of the third embodiment, although an example in which the second spatial filter is also served by the first spatial filter 22d when the backward scattered light is detected has been described, the present invention is not limited thereto. Similar to the previous example, when the first spatial filter 22c does not serves as the second spatial filter when the backward scattered light is detected, a spatial filter different from the first spatial filter 22c is disposed as the second spatial filter at position different from the position at which the first spatial filter 22c is disposed in the third optical path 37e and also the position in which the position of the first region and the position of the second region are in a substantially optically conjugate relationship.

As described above, in the flow cytometer 1e according to the present embodiment, the first objective lens 23 forms an image of the pattern of the structured illumination light at the image position 25 in the flow path and irradiates the observation object 5 with the structured illumination 4. The first spatial filter 22c is disposed in the first optical path 24e and functions as the first region (the transmission region 221c in the present embodiment) which causes some of the light emitted from the light source 20c to pass through the first spatial filter 22c and hinders the traveling of the light toward the observation object 5. The backward scattered light from the observation object 5 is transmitted through the whole or a part of the transmission region 221c of the first spatial filter 22c and detected by the second light detector 36c. In the flow cytometer 1e, the transmission region 221c of the first spatial filter 22c disposed on the side facing the image position 25 in the flow path is configured of a member which transmits light (a gap constituting the transmission region 221c in the present embodiment). The transmission region 221c transmits some of the illumination light emitted from the light source 20c and hinders the traveling of the light toward the observation object 5. In the flow cytometer 1e, the backward scattered light from the observation object 5 passes through the transmission region 221c disposed on the side of the first spatial filter 22c which faces the image position 25 in the flow path again and is then detected by the second light detector 36c. The flow cytometer 1e includes the second imaging lens 35c and the second light detector 36c as the optical detection system 3e related to the detection of the backward scattered light from the observation object 5.

With this configuration, in the flow cytometer 1e according to the present embodiment, it is possible to reduce an influence of the direct light emitted from the light source 20c when the backward scattered light from the observation object 5 is detected by the second light detector 36c. Further, in the flow cytometer 1e according to the present embodiment, the backward scattered light from the observation object 5 is parallelized via the first objective lens 23, and only the backward scattered light which has passed through the transmission region 221c of the first spatial filter 22c is detected by the second light detector 36c. As a result, in the flow cytometer 1e according to the present embodiment, the backward scattered light in addition to the forward scattered light can be detected as the scattered light which realizes a higher signal-to-noise ratio than in the conventional one. In the flow cytometer 1e according to the present embodiment, the illumination light can be modulated by a modulation device, and the structured illumination light can be irradiated to the observation object to simultaneously acquire the forward and backward scattered light. Therefore, morphological information with high-resolution on the observation object 5 can be obtained without labeling with a fluorescent substance (label-free), and the observation object 5 can be measured and classified non-invasively.

In each of the above embodiments, although the example in which light transmission or blocking is used as a method of hindering the traveling of the light emitted from the light source toward the observation object in the first region of the first spatial filter has been described, the present invention is not limited thereto.

When the first spatial filter has a blocking region as the first region, the blocking region blocks propagation of light which is not used as the light irradiated to the observation object. In this case, the blocking region may block the propagation of light using absorption or polarization of light. In the first spatial filter, the region other than the blocking region is configured of a transmission region which allows incident light to pass therethrough as it is.

The first spatial filter may spatially separate the light used as the illumination light from the one not used by changing the propagation direction between the light used to irradiate the observation object and the one not used and propagate only the light used as the illumination light toward the observation object. For example, the first spatial filter includes a single optical element (an optical filter) having different optical characteristics in the first region and the other regions. The first spatial filter uses this optical element to propagate incident light incident on the first region and the other regions in different directions. Here, the different optical characteristics include characteristics for reflection, characteristics for diffraction, characteristics for refraction, and the like.

The first spatial filter may hinder the traveling of the illumination light emitted from the light source toward the observation object using the diffraction. In addition, the first spatial filter may hinder the traveling of the illumination light emitted from the light source toward the observation object using the reflection. An example of using these first spatial filters which are different from those in the above embodiments will be described below.

Figure 12:
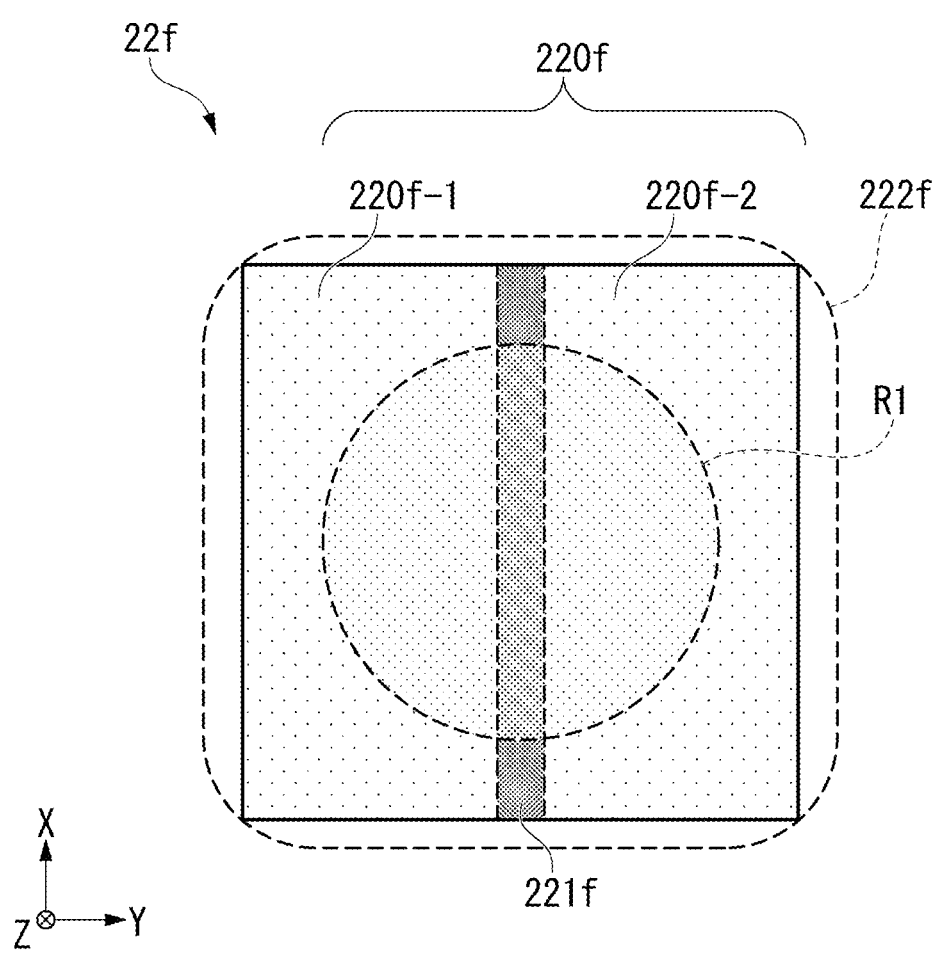
FIG. 12 is a diagram showing an example of the configuration of the first spatial filter integrated with a spatial optical modulation device according to the modified example of each of the embodiments of the present invention.
Figure 13:
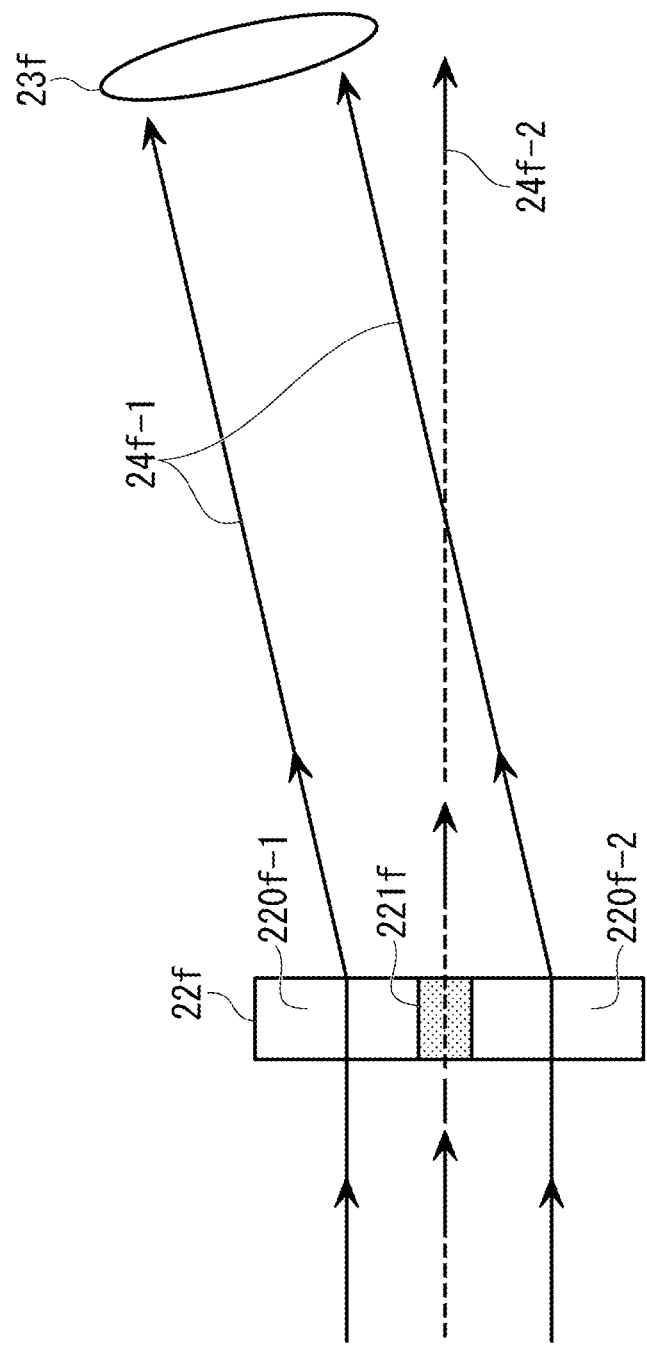
FIG. 13 is a diagram showing an example of an optical path taken by light spatially separated by the first spatial filter integrated with the spatial optical modulation device according to the modified example of each of the embodiments of the present invention.

Here, with reference to FIGS. 12 and 13, a case that the first spatial filter includes a single optical element having different optical characteristics in the first region and the other regions will be described. FIG. 12 is a diagram showing an example of the first spatial filter $22f$ according to the modified example of each of the embodiments. In the example shown in FIG. 12, the first spatial filter $22f$ and the spatial optical modulation device are integrally provided, and the first spatial filter $22f$ has the function for generating the structured illumination light possessed by the spatial optical modulation device of each of the above-described embodiments. That is, the first spatial filter $22f$ is a single optical element having different optical characteristics in its no-modulation region and other regions. Due to this configuration, the first spatial filter $22f$ has a function as a modulation element similar to the spatial optical modulation device simultaneously.

FIG. 12 shows a plane $222f$ when the plate-like first spatial filter $22f$ is seen from the light source side in the z-axis direction. A surface of the modulation element of the spatial optical modulation device seen from the light source side in the z-axis direction is located on the plane $222f$.

The surface of the first spatial filter $22f$ located on the plane $222f$ is divided into a structured illumination region $220f$ and a no-modulation region $221f$. In FIG. 12, the structured illumination region $220f$ of the first spatial filter $22f$ is separated by the no-modulation region $221f$ and consists of two unconnected regions, namely a structured illumination region $220f$-1 and a structured illumination region $220f$-2.

The structured illumination region $220f$ and the no-modulation region $221f$ are realized by a modulation element and have different optical characteristics from each other. The structured illumination region $220f$ is realized, for example, by designing a diffraction pattern for generating the structured illumination on a surface of the modulation element. As shown in FIG. 13, the first spatial filter $22f$ changes the propagation direction of light by diffracting the modulated light which has passed through the structured illumination region $220f$. The light of which the propagation direction is changed through the structured illumination region $220f$ is focused by the first objective lens $23f$ and used as the structured illumination irradiated to the observation object.

On the other hand, the light which has passed through the no-modulation region $221f$ of the first spatial filter $22f$ goes straight from the light source (that is, is transmitted) without being modulated. An image of a region in which the no-modulation region $221f$ and the irradiation region R1 overlap each other creates a shadow in the second spatial filter provided in a subsequent stage.

According to the first spatial filter $22f$, the light used for irradiating the observation object can be spatially separated from the one not used. At the same time, the first spatial filter $22f$ has the function for generating the structured illumination possessed by the spatial optical modulation device of each of the above-described embodiments. As shown in FIG. 13, according to the first spatial filter $22f$, only the light to be used can be propagated to the subsequent stage as the irradiation light to the observation object. An optical path $24f$-1 is an optical path of the irradiation light to the observation object. A first optical path $24f$-2 is an optical path taken by light that is not used for irradiating the observation object.

In the case that the first spatial filter includes a single optical element having different optical characteristics in the first region and the other regions, the first spatial filter and the spatial optical modulation device may be provided separately. Even in that case, it is possible to spatially separate the light used for irradiating the observation object from the light not used by using a diffraction element as the first spatial filter.

When the diffraction element is used as the first spatial filter and the first spatial filter is provided separately from the spatial optical modulation device, the first spatial filter is preferably provided between the light source and the spatial light modulator. That is, when the first spatial filter utilizes light transmission, blocking, or reflection as a method of hindering the traveling of the light emitted from the light source toward the observation object, the first spatial filter is preferably provided between the spatial optical modulation device and the image position in the flow path to which the structured illumination light is irradiated in the first optical path, and those cases have been described as an example in each embodiment. However, even in the embodiment in which light transmission, blocking, or reflection is used as a method of hindering the traveling of such light, the first spatial filter may be provided between the light source and the spatial optical modulation device, and in that case, a distance from the spatial optical modulation device is preferably short. On the other hand, it is also possible to use the diffraction element as the first spatial filter as another method in which the first spatial filter hinders the traveling of the illumination light of the light source toward the observation object. In that case, when the first spatial filter and the spatial optical modulation device are provided separately, the first spatial filter is preferably provided between the light source and the spatial optical modulation device in the first optical path, and more preferably, the distance from the spatial optical modulation device is short.

Figure 14:
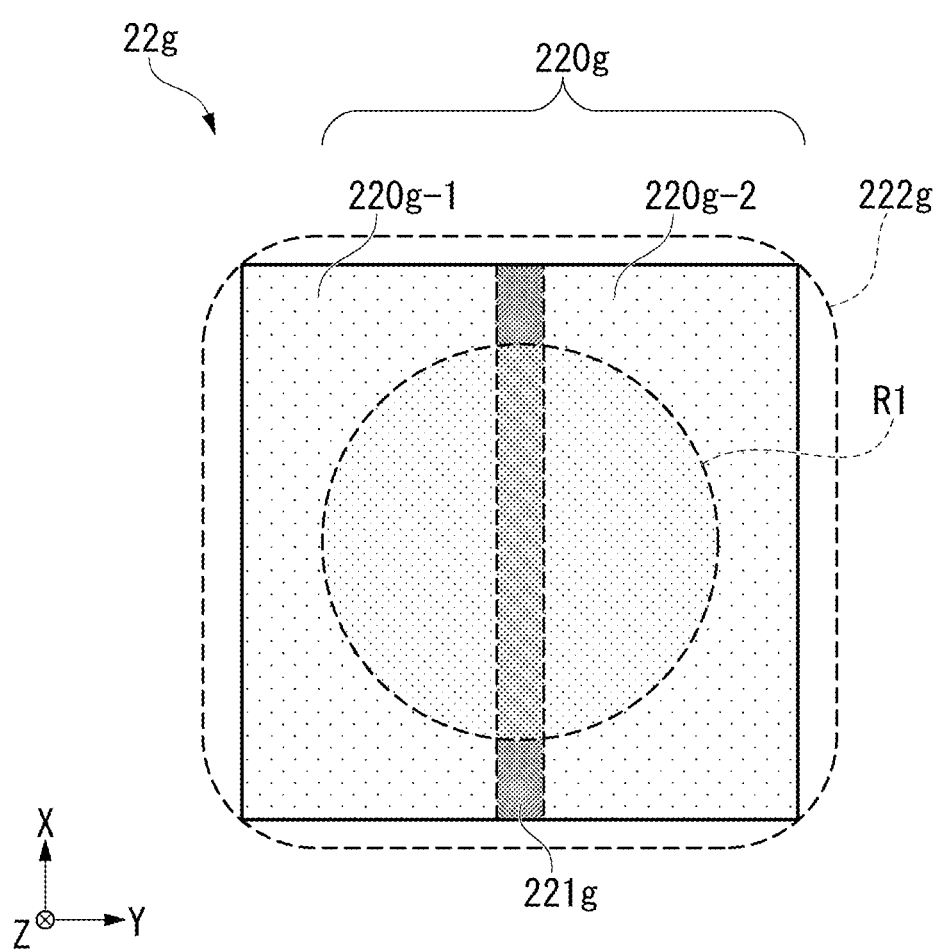
FIG. 14 is a diagram showing an example of a configuration of a first spatial filter including a mirror according to the modified example of each of the embodiments of the present invention.

Subsequently, with reference to FIGS. 14 and 15, a modified example of the embodiment in which the first spatial filter hinders the traveling of light toward the observation object in a method different from each of the above embodiments will be described. In the modified example of the present embodiment, the first spatial filter has a reflection region. FIG. 14 is a diagram showing an example of a first spatial filter 22g according to a modified example of each of the embodiments. In FIG. 14, a plane 222g when the plate-like first spatial filter 22g is seen from the light source in the z-axis direction is shown. A surface of the first spatial filter 22g on the light source side is located on the plane 222g.

The surface of the first spatial filter 22g on the plane 222g is divided into a transmission region 220g and a reflection region 221g. In FIG. 14, the transmission region 220g of the first spatial filter 22g is separated by the reflection region 221g and consists of two unconnected regions, namely a transmission region 220g-1 and a transmission region 220g-2. As shown in FIG. 15, the reflection region 221g has a protrusion 223g. The protrusion 223g has a mirror on a surface inclined by a predetermined angle with respect to the plane 222g and propagates incident light in a direction that does not enter an optical system in the subsequent stage by reflecting the incident light. A first optical path 24g-2 in FIG. 15 is an optical path taken by light which is not used for irradiating the observation object.

Figure 15:
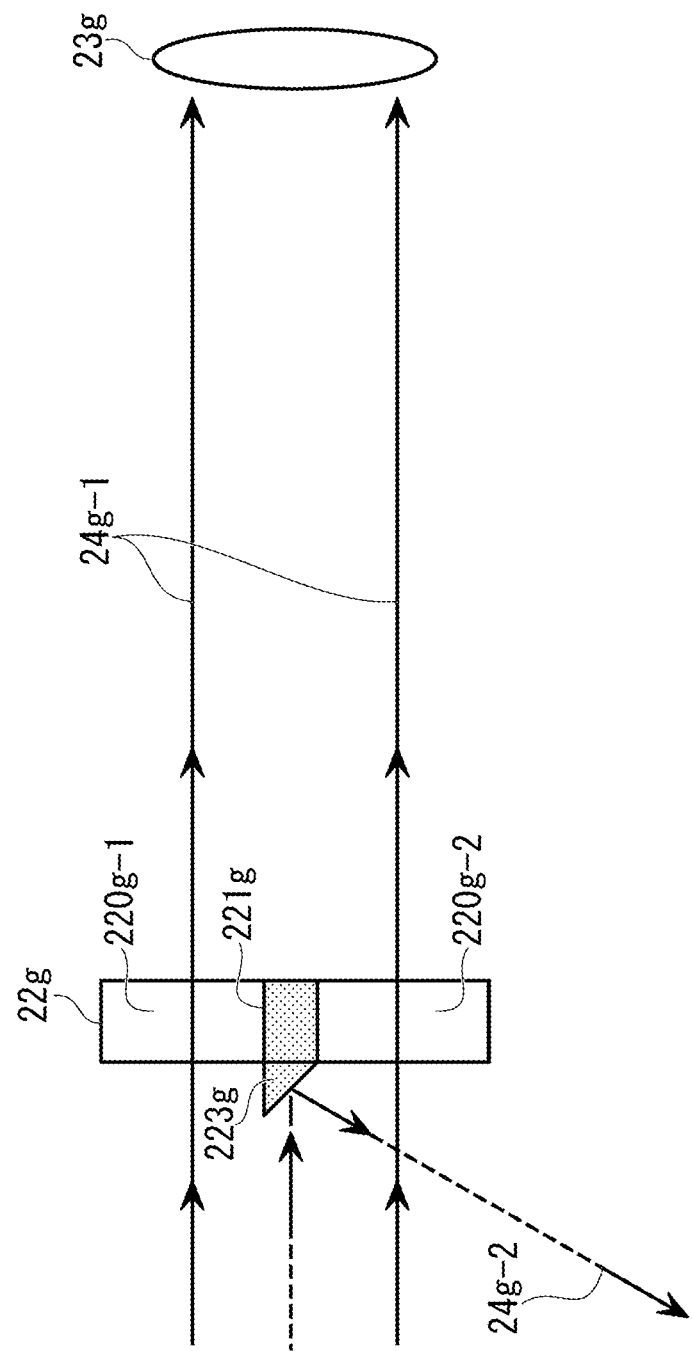
FIG. 15 is a diagram showing an example of an optical path taken by light spatially separated by the first spatial filter including the mirror according to the modified example of each of the embodiments of the present invention.

In the example of FIG. 15, a first objective lens 23g of the optical system in the subsequent stage is shown. The transmission region 220g transmits some of the illumination light from the light source 20a. (The optical path 24g-1 is an optical path of the irradiation light to the observation object.)

In this way, in the first spatial filter 22g, instead of blocking the propagation of the light incident on the first region, a mirror which reflects the incident light is disposed to propagate the incident light in a direction that does not enter the optical system in the subsequent stage.

In each of the above embodiments, an example of the case in which the optical illumination system 2 includes the first optical element (the first objective lens 23) has been described, but the present invention is not limited thereto. The optical illumination system 2 may further include one or more second optical elements in addition to the first optical element. The second optical elements form an image of the light modulated by the spatial optical modulation device in the first optical path. In this case, the first spatial filter is provided at a position in the first optical path other than a plurality of image positions including the image position of the structured illumination pattern made by the first optical element and one or more image positions by one or more second optical elements.

Fourth Embodiment

In each of the embodiments, although the case in which the light scattered forward or backward by the observation object is detected by the light detector has been described as an example of light in which the illumination light emitted from the light source is modulated by the observation object, the present invention is not limited thereto. As another example that the light in which the illumination light is modulated by the observation object is detected by the light detector, diffracted light generated by a structure in which a phase change is provided may be detected by the light detector. In the following example, an example will be described in which the second region of the second spatial filter disposed between the image position in the flow path and the light detector directs light diffracted or scattered by the observation object toward the light detector, an intensity and/or phase of the light transmitted through the observation object is modulated when the light passes through the whole or a part of the irradiation region R2 other than the second region in the second spatial filter, and phase difference information is obtained by interfering both of these lights on the light detector.

Figure 16:
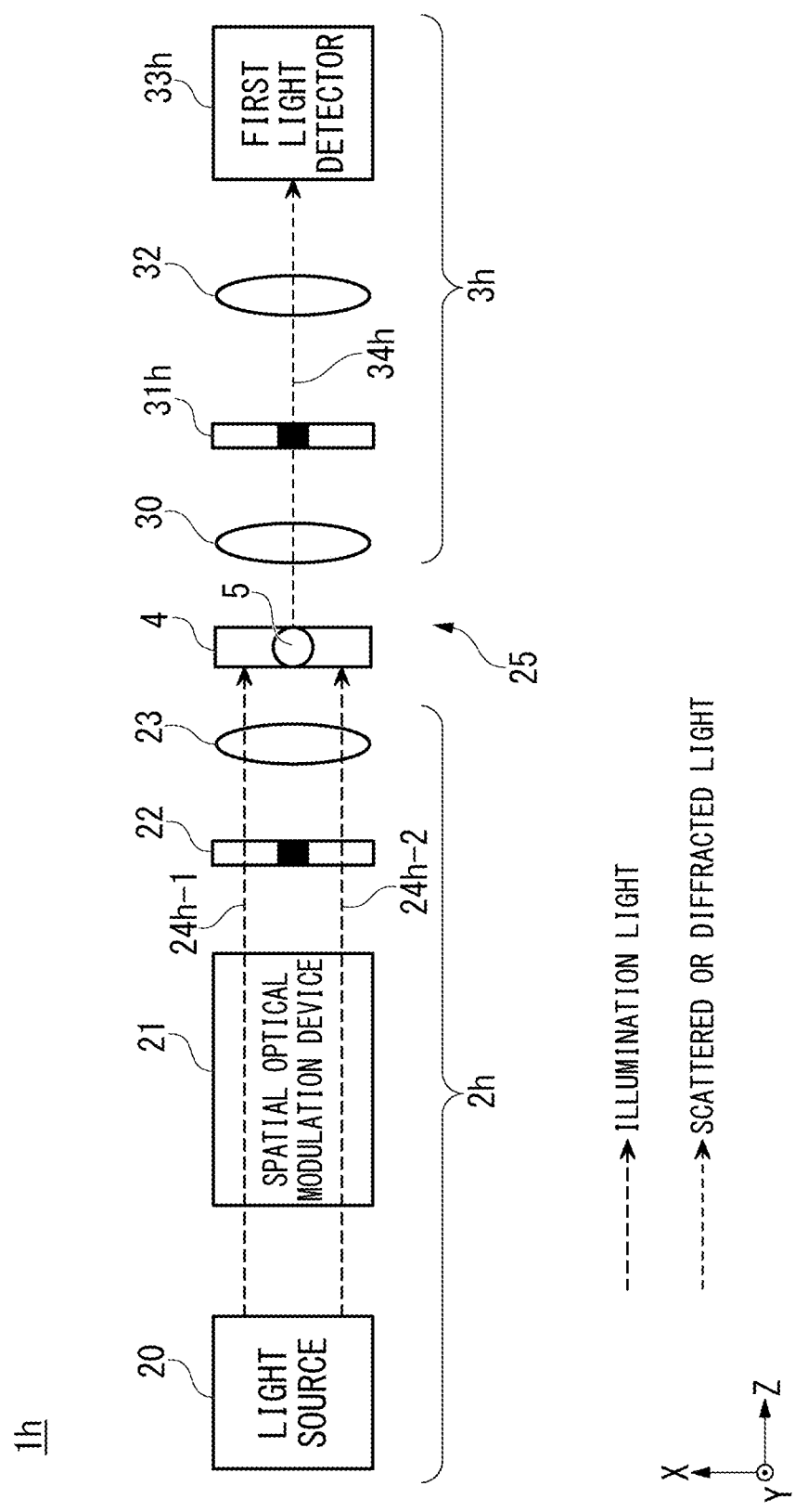
FIG. 16 is a diagram showing an example of a configuration of a flow cytometer according to a fourth embodiment of the present invention.

FIG. 16 is a diagram showing an example of a flow cytometer 1h according to the present embodiment. The flow cytometer 1h includes a flow path (not shown), an optical illumination system 2h, and an optical detection system 3h.

The same configurations and operations as those in the above-described embodiments are designated by the same reference numerals and a description thereof will be omitted.

An optical path of the illumination light of the optical illumination system 2h is referred to as a first optical path 24h. The first optical path 24h is parallel to the z-axis. In FIG. 16, as an example of the first optical path 24h, a first optical path 24h-1 and a first optical path 24h-2 are shown. The optical illumination system 2h includes the light source 20, the spatial optical modulation device 21, the first spatial filter 22, and the first objective lens 23. The light source 20, the spatial optical modulation device 21, the first spatial filter 22, and the first objective lens 23 are provided on the first optical path 24h in this order in a direction in which the illumination light is directed toward the observation object 5 flowing through the flow path. The first optical path 24h is an optical path taken by light which has passed through the transmission region of the first spatial filter 22 in a section between the first spatial filter 22 and the observation object 5.

The optical detection system 3h includes the second objective lens 30, a second spatial filter 31h, an imaging lens 32, and a first light detector 33h. In the optical detection system 3, an optical path of the forward scattered light or the diffracted light is referred to as a second optical path 34h. The second optical path 34h is parallel to the z-axis.

The second spatial filter 31h has a transmission region which transmits light modulated by the observation object 5 and a modulation region which modulates the intensity and/or phase of the light transmitted through the observation object 5. The light transmitted through the observation object 5 is direct light. The light modulated by the observation object 5 and transmitted by the transmission region is, for example, the forward scattered light scattered by the observation object 5, but may be diffracted light generated by the structure in which a phase change is provided. In the following description, the forward scattered light or diffracted light transmitted by the second spatial filter 31h through the transmission region is referred to as first light, and the light transmitted by the second spatial filter 31h and modulated by the modulation region is also referred to as second light. The transmission region of the second spatial filter 31h is an example of the a second region. The first light and the second light described above are detected by a first light detector 33h.

The imaging lens 32 forms images of the first light and the second light on the detection surface of the first light detector 33h. The imaging lens 32 may collect the first light and the second light on a detection surface of the first light detector 33h and may not strictly form the images.

The first light detector 33h detects information on the phase difference between the first light and the second light obtained by interfering the first light and the second light imaged on the detection surface by the imaging lens 32 with each other. Here, the light irradiated to the observation object 5 is the light structured by the spatial optical modulation device 21. Therefore, the first light detector 33h detects the information on the phase difference between the direct light and the forward scattered light (or the diffracted light) for the structured light. That is, the optical detection optical 3h detects the phase difference of the lights for the structured light. As described above, the intensity or the phase of light of the light that passed through the observation object 5 is modulated when the light passes through the whole or a part of a region (the modulation region in the present embodiment) other than the second region (the transmission region in the present embodiment) in the second spatial filter 31h, and the first light detector 33h detects the phase difference between the phase-modulated light and the light that has passed through the second region (the transmission region in the present embodiment) of the light modulated by the observation object 5.

According to the flow cytometer 1h, the phase difference of the lights for the structured light can be detected.

Modified Example of Fourth Embodiment

Figure 17:
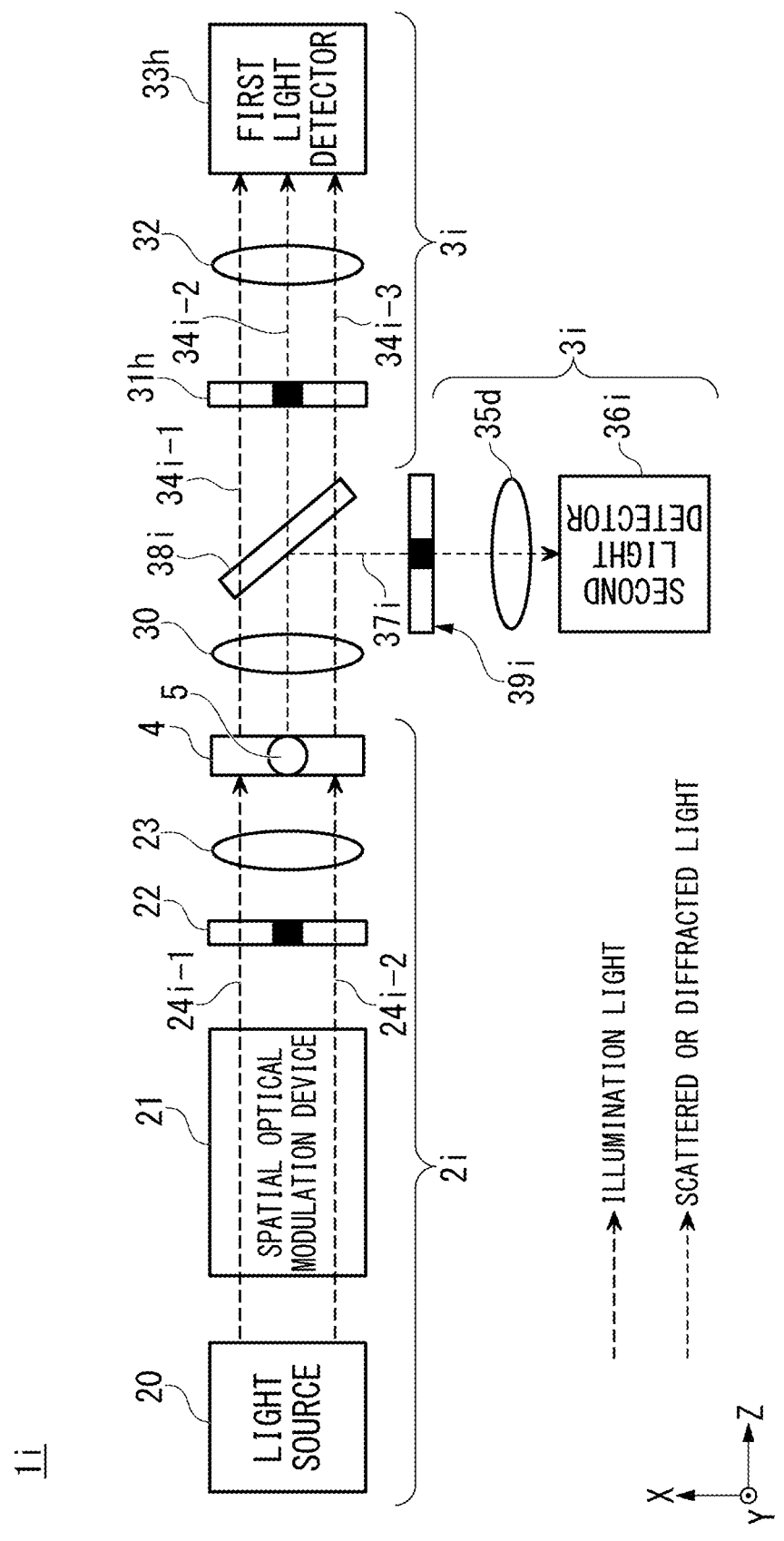
FIG. 17 is a diagram showing an example of a configuration of a flow cytometer according to a modified example of the fourth embodiment of the present invention.

Next, with reference to FIG. 17, a case in which the light modulated by the observation object is simultaneously detected not only as the phase difference information but also as the modulated light itself will be described as an example of a modified example of the fourth embodiment. FIG. 17 shows a case in which the forward scattered light or the diffracted light is detected as the light modulated by the observation object.

FIG. 17 is a diagram showing an example of a flow cytometer 1i according to a modified example of the present embodiment. The flow cytometer 1i includes a flow path (not shown), an optical illumination system 2i, and an optical detection system 3i.

The same configurations and operations as those in the above-described embodiments are designated by the same reference numerals, and a description thereof will be omitted.

An optical path of the illumination light of the optical illumination system 2i is referred to as a first optical path 24i. The first optical path 24i is parallel to the z-axis. In FIG. 16, as an example of the first optical path 24i, a first optical path 24i-1 and a first optical path 24i-2 are shown. The optical illumination system 2i includes the light source 20, the spatial optical modulation device 21, the first spatial filter 22, and the first objective lens 23. The light source 20, the spatial optical modulation device 21, the first spatial filter 22, and the first objective lens 23 are provided on the first optical path 24i in this order in the direction in which the illumination light is directed toward the observation object 5 flowing through the flow path. The first optical path 24i is an optical path taken by light which has passed through the transmission region of the first spatial filter 22 in a section between the first spatial filter 22 and the observation object 5.

The optical detection system 3i includes the second objective lens 30, a half mirror 38i, the second spatial filter 31h, the imaging lens 32, the first light detector 33h, a third spatial filter 39i, the second imaging lens 35d, and a second light detector 36i.

In the optical detection system 3i, the optical path in which the forward scattered light or diffracted light is directed to the first light detector to detect the phase difference information is referred to as a second optical path 34i. The second optical path 34i is parallel to the z-axis. In FIG. 17, as an example of the second optical path 34i, a second optical path 34i-1, a second optical path 34i-2, and a second optical path 34i-3 are shown. The second optical path 34i-1 and the second optical path 34i-3 are optical paths of light in which the light transmitted through the observation object 5 is transmitted through the half mirror 38i. The second optical path 34i-2 is an optical path taken by light in which the forward scattered light or diffracted light scattered by the observation object 5 has passed through the half mirror 38i.

The half mirror 38i extracts some of the light modulated by the observation object 5. That the half mirror 38i extracts some of the light means that some of light incident on the half mirror 38i is transmitted, some of the light is reflected, and either the transmitted light or the reflected light is propagated in a predetermined direction. The half mirror 38i is disposed in the second optical path 34i. The half mirror 38i is an example of a beam splitter which is an optical device that is disposed in the second optical path and extracts some of the light modulated by the observation object.

The configurations of the second spatial filter 31h, the imaging lens 32, and the first light detector 33h are the same as the configurations of the second spatial filter 31h, the imaging lens 32, and the first light detector 33h shown in FIG. 16, respectively.

Further, in the optical detection system 3i, the optical path in which the forward scattered light or the diffracted light is detected by the second light detector is referred to as a third optical path 37i. The third optical path 37i is an optical path taken by light in which the forward scattered light scattered by the observation object 5 or diffracted light is reflected by the half mirror 38i. The third optical path 37i is parallel to the x-axis.

The third spatial filter 39i, the second imaging lens 35d, and the second light detector 36i are provided on the third optical path 37i in this order in a direction in which the forward scattered light or diffracted light scattered by the observation object 5 travels.

The third spatial filter 39i includes a transmission region which transmits the forward scattered light scattered by the observation object 5 or the diffracted light, and a blocking region which blocks light transmitted through the observation object 5 (that is, direct light). The direct light blocked by the blocking region of the third spatial filter 39i is light reflected by the half mirror 38i in the x-axis direction of the direct light transmitted through the observation object 5. The transmission region of the third spatial filter 39i is an example of the third region.

The second imaging lens 35d forms an image of the forward scattered light or the diffracted light transmitted through the third spatial filter 39i on an image formation surface of the second imaging lens 35d. The second imaging lens 35d may collect the forward scattered light or the diffracted light on the detection surface of the second imaging lens 35d and may not form an image.

The second light detector 36i detects the forward scattered light or the diffracted light imaged on the detection surface by the second imaging lens 35d. The forward scattered light or the diffracted light imaged on the detection surface by the second imaging lens 35d is light in which the modulated light extracted by the half mirror 38i has passed through the transmission region of the third spatial filter 39i as described above. Therefore, the second light detector 36i detects the light modulated by the observation object 5 which has passed through the third region.

According to the flow cytometer 1i, for the structured light, in addition to the phase difference of the light, the forward scattered light scattered by the observation object 5 and the diffracted light can be detected simultaneously.

In the flow cytometer according to each of the above-described embodiments, since information including morphological information can be obtained at a higher resolution than the flow cytometer using a conventional line-shaped illumination light for scattered light from cells, it is possible to separate an observation object (for example, a target cell) at high speed based on morphological information in a non-invasive manner without labeling with a fluorescent label or the like (that is, label-free).

Although one embodiment of the present invention has been described in detail with reference to the drawings, the specific configuration is not limited to the above, and various design changes and the like can be made without departing from the gist of the present invention.

REFERENCE SIGNS LIST 1, 1a, 1b, 1c, 1d, 1e, 1h, 1i Flow cytometer
2, 2a, 2b, 2c, 2d, 2e, 2h, 2i Optical illumination system
3, 3a, 3b, 3c, 3d, 3e, 3h, 3i Optical detection system
20, 20a, 20c Light source
21, 21a, 21c Spatial optical modulation device
22, 22a, 22b, 22c, 22d First spatial filter
221, 221b, 310a Blocking region
220a, 223a, 311a, 221g Reflection region
220, 220b, 220g, 221a, 311 Transmission region
220f Structured illumination region
221f No-modulation region
23 First objective lens
31, 31a, 31d, 31h Second spatial filter
33, 33a, 33c, 33h First light detector
36d, 36c, 36i Second light detector
39i Third spatial filter
24, 24a, 24b, 24c, 24d, 24e, 24h, 24i First optical path
34, 34a, 34b, 34c, 34d, 34e, 34h, 34i Second optical path
25 Image position
5 Observation object

What is claimed is:

1. A flow cytometer comprising:
a flow path configured to direct an object;
an optical illumination system comprising:
　a light source configured to emit light;
　a spatial optical modulator configured to generate a structured illumination pattern by modulating the light emitted from the light source;
　a first spatial filter comprising:
　　a region disposed on a surface of the first spatial filter facing the light source, wherein the region is configured to generate a modified structured illumination pattern by hindering a portion of the structured illumination pattern; and
　a first lens configured to form an image of the modified structured illumination pattern from the first spatial filter, wherein the image of the modified structured illumination pattern is disposed at a position in the flow path; and
　wherein the first spatial filter is disposed in a first optical path between the light source and the position in the flow path;
an optical detection system comprising:
　a second lens configured to direct a transmitted light from the object in the flow path onto a blocking region of a second spatial filter;
　wherein the second spatial filter is disposed in a second optical path between a light detector and the position in the flow path;
　wherein the second spatial filter comprises:
　　the blocking region; and
　　another region configured to direct a modified light modulated from the object in the flow path towards the light detector; and
　wherein the light detector is configured to detect the modified light;
　wherein the first spatial filter and the second spatial filtered are positioned in a substantially optically conjugate relationship.

2. The flow cytometer according to claim 1, wherein the modified light comprises scattered light or diffracted light.

3. The flow cytometer of claim 1, wherein the region of the first spatial filter hinders the portion of the structured illumination pattern transmitting, blocking, diffracting, or reflecting, or any combination thereof, of the portion of the structured illumination pattern.

4. The flow cytometer of claim 1, wherein the first spatial filter further comprises a reflecting region configured to reflect another modified light from the object towards another light detector; wherein the reflecting region is disposed on a surface facing the position; and
wherein the optical detection system further comprises the another light detector; wherein the another light detector is configured to detect the another modified light from the reflecting region.

5. The flow cytometer of claim 1, wherein the spatial optical modulator further comprises the first spatial filter.

6. The flow cytometer of claim 1, wherein the spatial optical modulator comprises a diffractive optical element (DOE), a spatial light modulator (SLM), a digital micromirror device (DMD), or a film with a surface comprising a plurality of regions having different optical characteristics, or any combination thereof.

7. The flow cytometer of claim 1, wherein the spatial optical modulator comprises a diffractive optical element (DOE).

8. The flow cytometer of claim 1, wherein the spatial optical modulator comprises a film with a surface comprising a plurality of regions having different optical characteristics.

9. The flow cytometer of claim 1, wherein the second lens is disposed between the position and the second spatial filter.

10. The flow cytometer of claim 1, further comprising a flow cell, wherein the flow cell comprises the flow path.

11. The flow cytometer of claim 1, wherein the spatial optical modulator is further configured to generate a first irradiation region on the first spatial filter by directing the structured illumination pattern to the first spatial filter.

12. The flow cytometer of claim 11, wherein the first spatial filter further comprises a first overlapping region in which the first region and the irradiation region overlap.

13. The flow cytometer of claim 12, wherein the second lens is further configured to generate a second irradiation region on the second spatial filter by directing the transmitted light of the structured illumination pattern to the second spatial filter.

14. The flow cytometer of claim 13, wherein the second spatial filter further comprises a second overlapping region in which the another region and the second irradiation region overlap.

15. The flow cytometer of claim 14, wherein the second lens is further configured to form an image of the first overlapping region onto the second spatial filter, and wherein the image of the first overlapping region has the same size or a larger size than the second overlapping region.

16. The flow cytometer of claim 1, further comprising a third lens disposed between the second spatial filter and the light detector, wherein the third lens is configured to form an image of the modified light from the second spatial filter onto the light detector.

17. The flow cytometer of claim 1, wherein the first spatial filter further comprises one or more propagating regions configured to transmit or reflect the modified structured illumination pattern towards the first lens.

18. The flow cytometer of claim 17, wherein the region of the first spatial filter hinders the portion of the structured illumination pattern by transmitting the portion of the structured illumination pattern, and wherein the region is further configured to direct another modified light from the object towards another light detector, and wherein the optical detection system further comprises the another light detector, wherein the another light detector is configured to detect the another modified light from the region of the first spatial filter.

19. The flow cytometer of claim 1, wherein the spatial optical modulator is positioned between the light source and the first spatial filter in the first optical path.

20. The flow cytometer of claim 1, wherein the another region of the second spatial filter directs the modified light to the light detector by transmitting or reflecting at least a portion of the modified light.

\* \* \* \* \*